(12) United States Patent
Bylander

(10) Patent No.: US 7,006,731 B2
(45) Date of Patent: Feb. 28, 2006

(54) APPARATUS AND METHOD FOR ADJUSTING THE SPECTRAL RESPONSE OF AN OPTICAL WAVEGUIDE GRATING

(75) Inventor: James R. Bylander, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 230 days.

(21) Appl. No.: 10/610,962

(22) Filed: Jul. 1, 2003

(65) Prior Publication Data

US 2005/0002609 A1    Jan. 6, 2005

(51) Int. Cl.
*G02B 6/34* (2006.01)
(52) U.S. Cl. .......................................... 385/37; 385/13
(58) Field of Classification Search .................. 385/37, 385/12–13
See application file for complete search history.

(56) References Cited

U.S. PATENT DOCUMENTS

| | | |
|---|---|---|
| 4,953,939 A | 9/1990 | Epworth |
| 5,613,023 A | 3/1997 | Guillon et al. |
| 5,671,307 A | 9/1997 | Lauzon et al. |
| 5,694,501 A | 12/1997 | Alavie et al. |
| 5,982,963 A | 11/1999 | Feng et al. |
| 6,055,348 A | 4/2000 | Jin et al. |
| 6,081,640 A | 6/2000 | Ouellette et al. |
| 6,122,421 A | 9/2000 | Adams et al. |

(Continued)

FOREIGN PATENT DOCUMENTS

| | | |
|---|---|---|
| JP | 2001-296418 | 10/2001 |
| WO | WO 01/37015 A1 | 5/2001 |
| WO | WO 01/40835 A2 | 6/2001 |
| WO | WO 01/90790 A1 | 11/2001 |

OTHER PUBLICATIONS

M. LeBlanc, et al, "Tunable Chirping of a Fibre Bragg Grating Using a Tapered Cantilever Bed", *Electronics Letters* (Dec. 8, 1994), vol. 30, No. 25, pp. 2163-2164.

S. Y. Set, et al, "Tunable Nonlinearly-Bend-Chirped Fiber Bragg Grating for Third-Order Dispersion Compensation", *Conference on Lasers and Electro-Optics—Technical Digest* (2001); Baltimore, MD; pp. 496-497.

C. Hu, et al; "Passive Athermal-Packaged Tunable Fiber Bragg Grating for OADM's", *4th Pacific Rim Conference on Lasers and Electro-Optics—Technical Digest* (Jul. 2001); Chiba, Japan; pp. I-408-I409.

A-Ping Zhang, et al; "Experimental and Theoretical Analysis of Fiber Bragg Gratings Under lateral Compression", *Optics Communications* (May 15, 2002); Elsevier Science B.V.; vol. 206; pp. 81-87.

*Primary Examiner*—John D. Lee
*Assistant Examiner*—Jerry T Rahll
(74) *Attorney, Agent, or Firm*—Gregg H. Rosenblatt

(57) ABSTRACT

Apparatuses and methods for adjusting the spectral response of an optical waveguide grating. A controlled extension is imparted to a surface of a support member and an optical waveguide grating is attached to the extended surface. The controlled extension is removed from the support member to create a compressive axial strain on the grating, and the spectral response of the grating is subsequently adjusted by altering the axial strain in the grating.

15 Claims, 16 Drawing Sheets

U.S. PATENT DOCUMENTS

| | | |
|---|---|---|
| 6,148,127 A | 11/2000 | Adams et al. |
| 6,169,831 B1 | 1/2001 | Adams et al. |
| 6,181,852 B1 | 1/2001 | Adams et al. |
| 6,233,374 B1 | 5/2001 | Ogle et al. |
| 6,278,811 B1 | 8/2001 | Hay et al. |
| 6,301,423 B1 | 10/2001 | Olson |
| 6,345,134 B1 | 2/2002 | Laming et al. |
| 6,360,042 B1 | 3/2002 | Long |
| 6,361,299 B1 | 3/2002 | Quigley et al. |
| 6,363,187 B1 | 3/2002 | Fells et al. |
| 6,493,486 B1 | 12/2002 | Chen |
| 6,738,536 B1 | 5/2004 | Boettcher et al. |
| 2001/0048788 A1 | 12/2001 | Xie et al. |
| 2002/0131709 A1 | 9/2002 | Miller et al. |

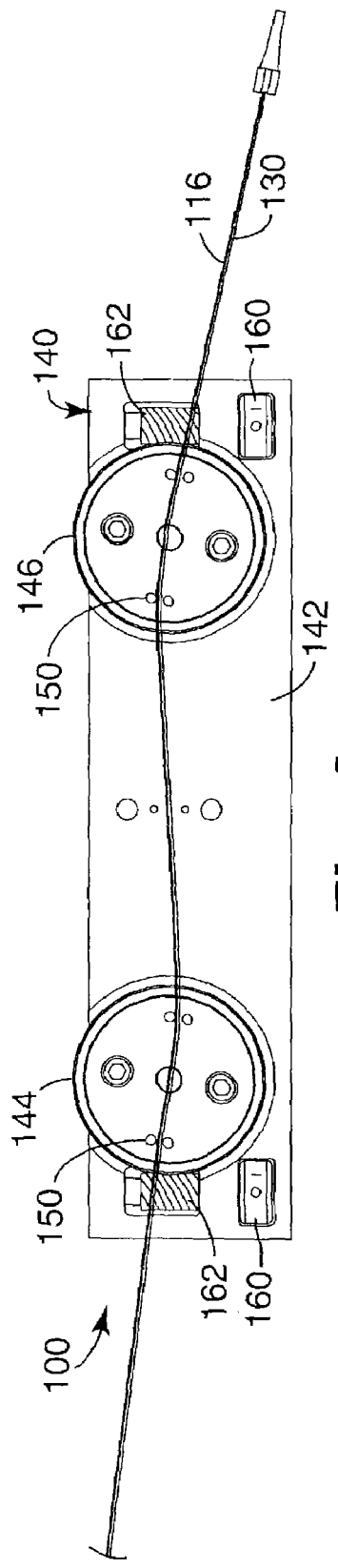
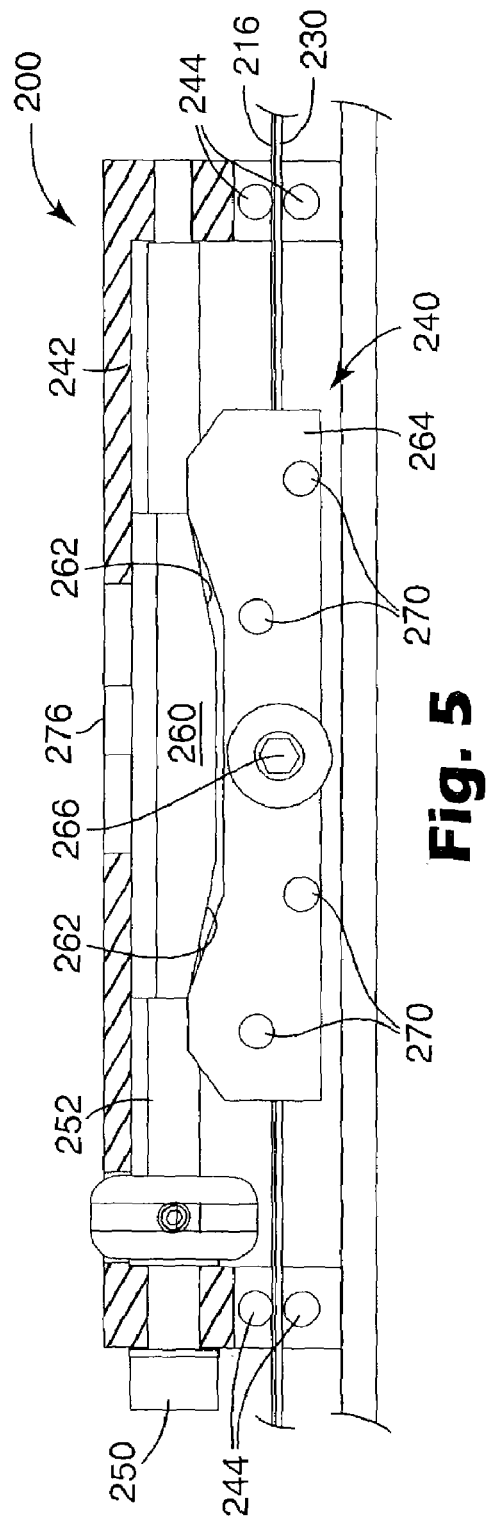

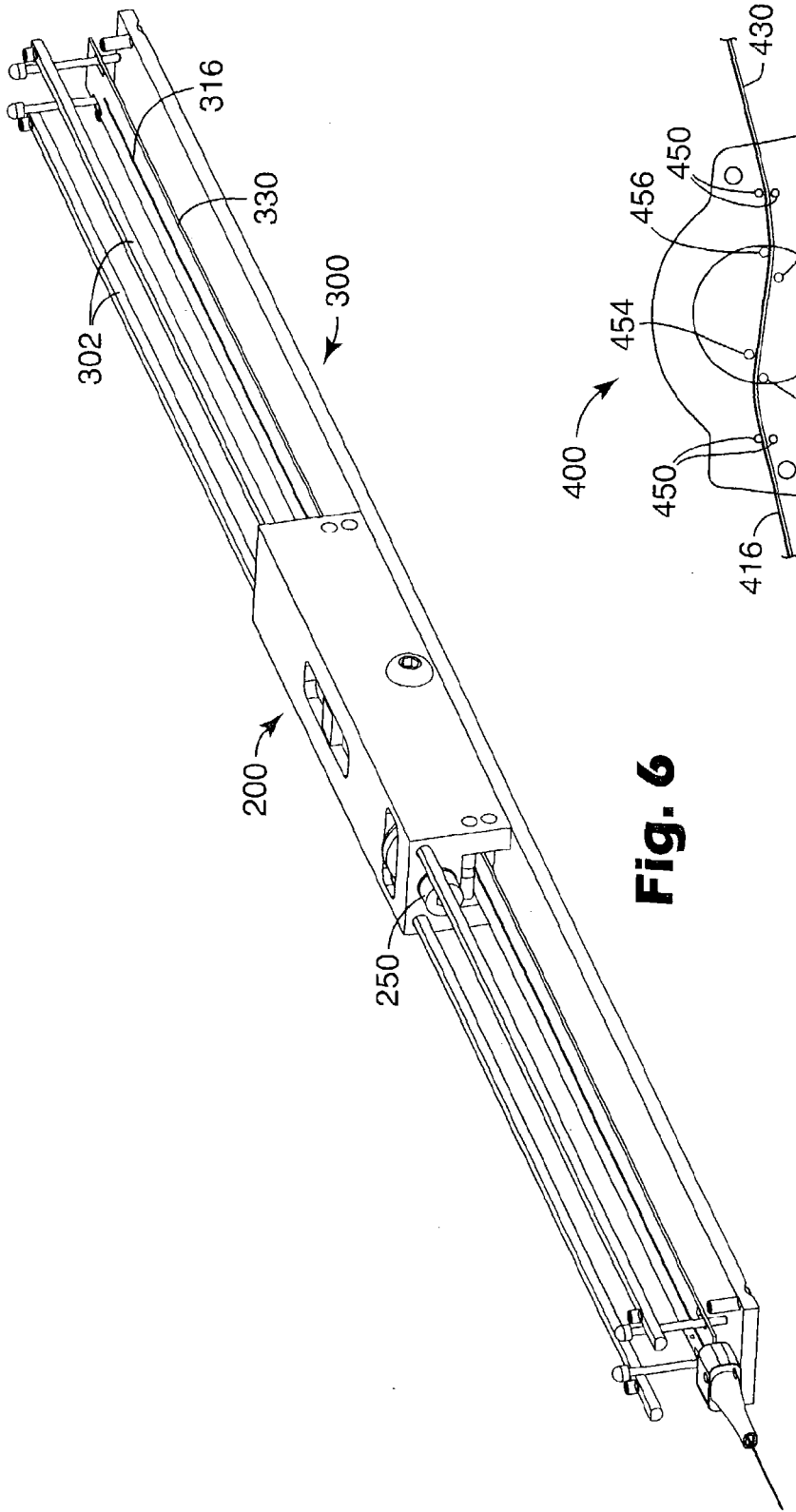
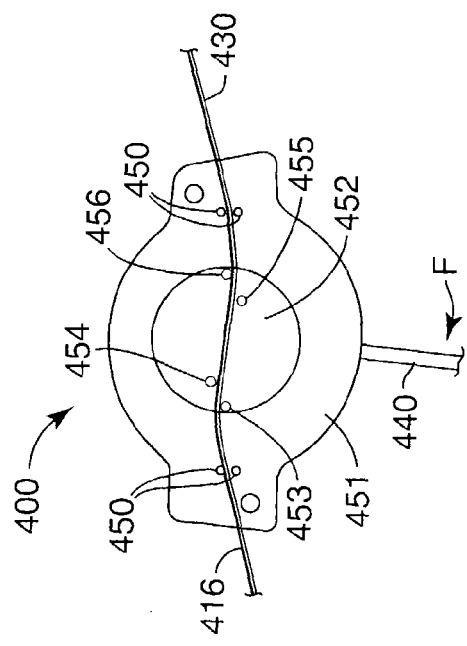
Fig. 6
Fig. 7

APPARATUS AND METHOD FOR ADJUSTING THE SPECTRAL RESPONSE OF AN OPTICAL WAVEGUIDE GRATING

FIELD

This invention generally relates to optical waveguide gratings. More particularly, this invention relates to an apparatus and method for adjusting the spectral response of an optical waveguide grating.

BACKGROUND

Optical fibers are thin strands of glass capable of transmitting information containing optical signals over long distances with low loss of signal strength. In essence, an optical fiber is a small diameter waveguide consisting of a fiber core having a first index of refraction surrounded by a fiber cladding layer having a second lower index of refraction. So long as the refractive index of the core is sufficiently higher than the refractive index of the cladding, a light beam propagating along the core exhibits total internal reflection and is guided along the length of the core. Typical optical fibers are made of high purity silica, with various concentrations of dopants added to control the index of refraction of the core and the cladding.

Many optical materials exhibit different responses to optical waves of different wavelengths. One such phenomenon is chromatic dispersion (or simply "dispersion") in which the speed of light through an optical medium is dependent upon the wavelength of the optical wave passing through the medium. Since the index of refraction for a material is the ratio of the speed of light in a vacuum (a constant) to the speed of light in the material, it therefore follows that the index of refraction also typically varies as a function of wavelength in these materials.

Optical fibers are frequently used in data networks (such as telecommunication networks) requiring high data transmission rates. In many networks, data is also transmitted over very long distances. As the distances over which data is transmitted increase, or the rates at which data is transmitted increase, chromatic dispersion presents obstacles to achieving error free performance. Specifically, in long distance transmission of optical signals such as from a laser, the laser bandwidth and the modulation used to encode data onto the laser beam results in a range of wavelengths being used to transmit the information. The combination of this range of wavelengths and the chromatic dispersion of the fiber accumulated over a distance results in pulse broadening or spreading. For example, at high data rates two adjacent optical pulses or wave fronts may eventually overlap each other due to chromatic dispersion. Such overlapping can cause errors in data transmission. The accumulation of chromatic dispersion increases as the distance the optical signals travel increases. For low speed signals, dispersion is not typically a problem as they may use a smaller range of wavelengths, resulting in a smaller range of delays in the transmission path, and they also have a longer time period in which to determine the state of each bit.

Attempts to compensate for chromatic dispersion include the use of dispersion compensating fibers, dispersion compensating optical waveguide gratings (e.g., fiber Bragg gratings), and a combination of both. Dispersion compensating fibers and dispersion compensating optical waveguide gratings introduce a negative chromatic dispersion with an equal and opposite sign to the accumulated dispersion in a fiber link.

Optical gratings suitable for dispersion compensation may include Bragg gratings, and long period gratings. These gratings typically comprise a body of material with a plurality of spaced apart optical grating elements disposed in the material. For example, a conventional Bragg grating comprises an optical fiber in which the index of refraction undergoes periodic perturbations along its length. The perturbations may be equally spaced, as in the case of an unchirped grating, or may be unequally spaced as in the case of a chirped grating. That is, a chirp is a longitudinal variation in the grating period along the length of the grating. The wavelength reflected in a Bragg grating is directly related to the period of the perturbation. Thus, in a chirped fiber grating, the reflected wavelength of the grating changes with the position along the fiber grating. As the grating period increases or decreases along a direction in the fiber grating, the reflected wavelength increases or decreases accordingly. Therefore, different spectral components in an optical signal are reflected back at different locations along the grating and accordingly have different delays. Such wavelength dependent delays may be used to negate the accumulated dispersion of an optical signal. Chirped gratings may be linearly chirped (having perturbations that vary in a linear fashion), non-linearly chirped, or randomly chirped.

Fiber Bragg gratings reflect light over a given waveband centered around a wavelength equal to twice the spacing between successive perturbations. The reflected wavelength is given by the Bragg Equation $\lambda=2dn$, where n is the effective index of the grating, $\lambda$ is the reflected wavelength, and d is the distance between successive perturbations. The remaining wavelengths pass essentially unimpeded. The ability to pass some wavelengths in an unimpeded manner is desirable in optical filtering applications. In such applications, the frequency of the grating can be selected to reflect (i.e., filter) undesired wavelengths, while allowing desired wavelengths to pass.

Fiber gratings may be extrinsically chirped or intrinsically chirped. An extrinsic chirp refers to a chirp in the grating that is obtained by applying an external perturbation generating field to the fiber. For example, to create an extrinsically chirped grating, an external gradient, typically comprised of strain gradients or temperature gradients, is applied along the length of a non-chirped fiber grating, resulting in non-uniform changes in properties of the fiber grating, thus creating a chirp. An extrinsic chirp is valuable in that it may be applied to adjust the parameters of the grating, and it may be used to control the chromatic dispersion of a fiber Bragg grating.

There are disadvantages, however, in forming chirped gratings with an external gradient. The maximum range of chirping that can be achieved is limited in that relatively large gradients or strains are required to obtain a range of chirping. Such externally applied strains may have a negative impact on the reliability of the fiber, such as by causing the fiber to fracture. Thus, the maximum chirp rate that can be imposed on the grating is limited by the material properties of the fiber.

An intrinsic chirp refers to a chirp in the grating that has been incorporated into the fiber during the fabrication process. For example, an intrinsic chirp may be achieved by using a phase mask in which the period of the phase mask varies in some manner. When radiation is applied to the fiber through the phase mask (thus altering the index of refraction), the resulting fiber will be intrincally chirped. Using this technique, broadband gratings may be produced which can compensate for chromatic dispersion in multi-channel system. However, intrinsic chirp corrects a fixed amount of dispersion in a specified wavelength spectrum. While intrinsically chirped gratings are useful in communication systems where a specific amount of dispersion compensation is required, the dispersion and amplitude response of the grating is essentially fixed. Thus, intrinsically chirped gratings by themselves are not well suited to situations in which dynamically adjustable devices are required.

A variety of approaches exist for adjusting the spectral response (i.e., "tuning") of gratings in optical fibers. The application of strain to the grating is one method. For example, simply stretching the grating by gripping the fiber on either end of the grating and then putting the fiber in tension. The act of imparting a tensile strain on the grating results in a proportional increase in the wavelength of the spectral response, as per the following equation $$\Delta\lambda = \lambda_{max}(1 - p_e)\frac{\Delta L}{L}$$

where $\Delta\lambda$ is the wavelength shift resulting from the imparted tensile strain, $\Delta L/L$; $\lambda_{max}$ is the maximum wavelength; and $p_e$ is the strain optic coefficient of the grating (an intrinsic property of the fiber in which the grating is written). Other approaches use bending of a simple structural member to put a strain on an attached grating. Each of these approaches is limited in the applications it can address.

In particular, a problem with current devices and methods requiring the application of tensile strain to the grating is the potential for tensile failure of the fiber. This problem severely limits the amount of strain that can be reliably imposed. Methods wherein the fiber is attached to a support member and the support member is then put into tension are likewise limited.

Short gratings (less than approximately 100 mm in length) have also been tuned using axial compression. For example, a grating may be attached to the inside of a ferrule and the ferrule placed in compression. When using a uniform ferrule, the wavelengths reflected will shift uniformly downward. When using a non-uniform ferrule, both the dispersion characteristics of the grating and the center wavelength change with changes in the force applied to the ferrule. Since only compression is used, tensile failure of the grating ceases to be an issue. However, the length of grating that can be economically tuned using this method is very limited. The length is also limited by column buckling of the ferrule, which requires that, for a given strain, the diameter of a cylinder increases as a function of its length. Furthermore, the force required to generate a given strain increases with the square of the diameter. These factors limit the use of the described compression tuning methods for long gratings (greater than approximately 100 mm in length).

Another problem current devices and methods for tuning share is that the wavelengths shift in all sections of the grating at the same time, although not necessarily by the same amount. Designs have been attempted that independently tune small elements within a grating. These designs have generally not been commercially successful due to their great complexity, large number of parts and high cost. For example, U.S. Pat. No. 5,694,501 discloses an apparatus and method of controlling strain in a Bragg grating that requires a segmented piezoelectric stack with quasi-distributed voltage control. The segmented piezoelectric stack and control system are complex, and a constant supply of power is required to maintain a selected strain profile.

Clearly, previous attempts to provide dispersion compensating devices and methods have not produced adequate results. In particular, previous attempts have not satisfactorily addressed the unique issues associated with adjusting the spectral response of long gratings or sections of long gratings. If methods representing the current technology were used to adjust the spectral response of long gratings, the result would be severely limited ranges of adjustability, or unacceptably high levels of tensile strain (>1%) on the fiber for high reliability. Currently available devices and methods also do not provide the capability to tune the dispersion of a single channel (wavelength) of a multi-channel grating at any wavelength within a broad operating range. A need exists for an apparatus and method that addresses the above described shortcomings.

SUMMARY

The embodiments according to the invention described herein provide apparatuses and methods for adjusting the spectral response of an optical waveguide grating in a flexible manner.

Some embodiments according to the invention provide settable or tunable dispersion compensators. Other embodiments according to the invention may be used in tunable add/drop multiplexers or a variety of other devices that would benefit from the use of an adjustable filter. Still other embodiments according to the invention utilize mechanical adjustment of the spectral response such that once set the apparatus has no power requirement. Still other embodiments according to the invention provide compressive pre-load on the optical waveguide grating to reduce or eliminate reliability concerns related to tensile failure. Still other embodiments according to the invention allow selection and adjustment of any particular channel within the operating band of a multi-channel grating. Still other embodiments according to the invention allow the wavelength to be set at each of two points in an optical wavelength grating, with the result being a defined channel width and dispersion.

One embodiment according to the invention provides an apparatus for adjusting the spectral response of an optical waveguide grating. The apparatus includes a support member for attaching an optical waveguide. The optical waveguide grating is compressively axially strained by the support member. An adjustment mechanism alters the axial strain of the optical waveguide grating to adjust its spectral response.

Another embodiment according to the invention provides a method for adjusting the spectral response of an optical waveguide grating. A controlled extension is imparted to a surface of a support member. The controlled extension may alternately be imparted by either a mechanical load or a thermal load. An optical waveguide grating is attached to the surface of the support member such that a longitudinal axis of the grating in alignment with the direction of the controlled extension of the surface of the support member. The controlled extension is removed from the support member to create a compressive axial strain on the grating, and the spectral response of the grating is adjusted by altering the axial strain in the grating.

BRIEF DESCRIPTION OF THE DRAWINGS

FIG. 4 illustrates another embodiment of an apparatus for adjusting the spectral response of an optical waveguide grating according to the invention.

FIG. 5 illustrates yet another embodiment of an apparatus for adjusting the spectral response of an optical waveguide grating according to the invention.

FIG. 6 illustrates an alternate configuration for the apparatus of FIG. 5.

FIG. 7 illustrates yet another embodiment of an apparatus for adjusting the spectral response of an optical waveguide grating according to the invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
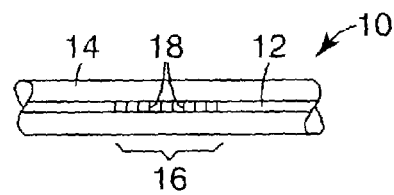
FIG. 1 illustrates an exemplary optical fiber Bragg grating.

Referring now to the drawings and in particular to FIG. 1 thereof, an optical waveguide 10 is shown to be configured as an optical fiber of which only a relatively short longitudinal length is depicted and which includes a fiber core 12 and a fiber cladding 14 surrounding the fiber core 12. The fiber core incorporates a grating 16 that includes a plurality of grating elements 18, each grating element 18 extending substantially normal to the longitudinal axis of the core 12. The spectral response (i.e., wavelength and chromatic dispersion) of the grating 16 can be adjusted (or "tuned") by altering the average index of refraction of the grating structure, changing the spacing between grating elements 18, or by using a combination of the two.

For reasons of clarity, the various embodiments according to the invention are described herein with respect to optical waveguides configured as optical fibers. However, the teachings of the invention are equally applicable to other types of optical waveguides. Similarly, the various embodiments according to the invention are for the most part described herein with respect to devices and methods that adjust the spectral response of portions of long gratings. However, the embodiments according to the invention are applicable to adjusting the spectral response of a portion of any length grating, including the full length of a grating. Long gratings are generally considered to be gratings having a length of 100 mm or greater. Broadband gratings in the range of 1–3 meters long (or even longer) may be used in long distance optical communication systems.

Axial Pre-compression

One aspect of the present invention provides an apparatus for adjusting the spectral response of an optical waveguide grating having high reliability (i.e., reduced susceptibility to fiber failure due to static fatigue) by applying a compressive axial preload to the grating prior to packaging the grating. This compressive preload reduces or eliminates potentially damaging tensile strain in the grating when the spectral response of the grating is subsequently adjusted using a controlled application of tensile strain.

Figure 2A:
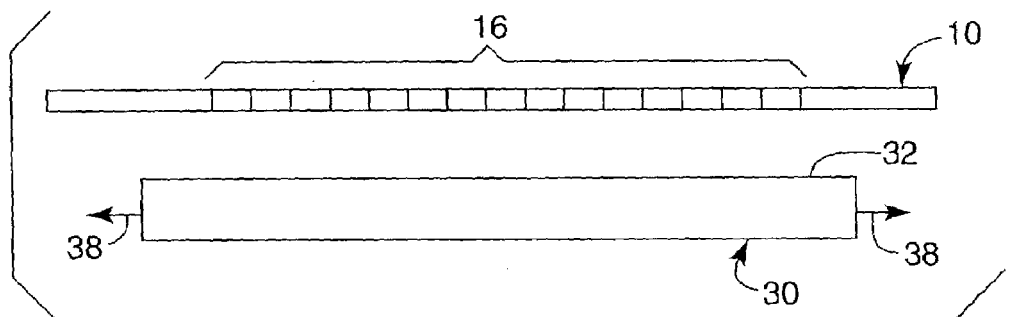
FIGS. 2A–2C illustrate one method of forming an apparatus for adjusting the spectral response of an optical waveguide grating according to the invention.
Figure 2B:
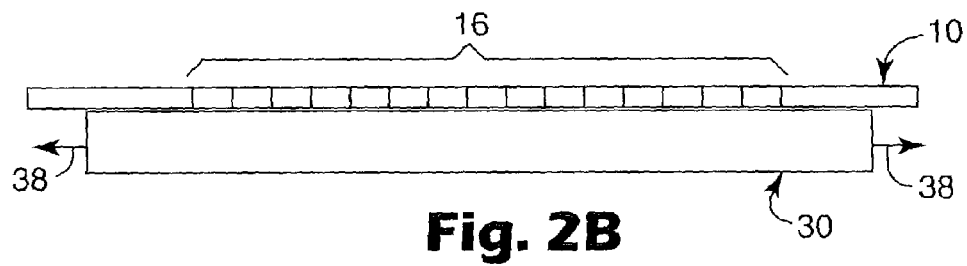
Figure 2C:
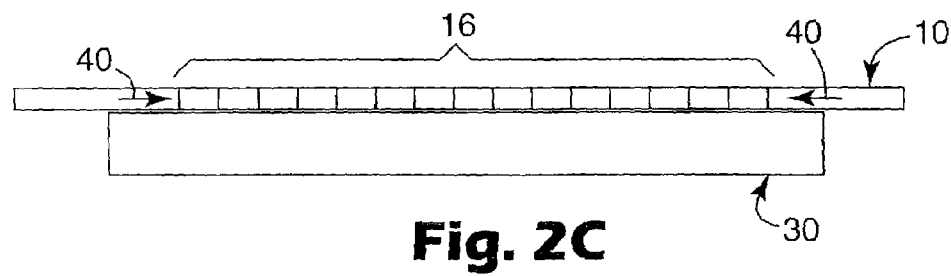

One embodiment of an apparatus for adjusting the spectral response of an optical waveguide grating having a compressive preload and a method of forming such an apparatus is illustrated in FIGS. 2A–2C. The apparatus has an optical waveguide 10, including an optical grating 16, attached to a support member 30. The optical grating 16 is subjected to axial compression by support member 30 so that optical grating 16 is under a compressive axial strain prior to any adjustment (i.e., "tuning") of the spectral response of the grating. The apparatus is tuned by altering the strain in the optical grating 16. In one embodiment, the strain of optical grating 16 is altered by the application of mechanical bending forces to the support member 30. In another embodiment, the strain of optical grating 16 is altered by controlled heating or cooling of the support member 30.

One method of forming an apparatus for adjusting the spectral response of an optical waveguide grating having a compressive preload is as follows. First, the range of wavelengths (operating band) of a single channel or channels to be adjusted is determined, together with the range of dispersion values (dispersion range) over which the grating will be adjusted. Next, a preliminary optical grating design that allows the optical grating to be adjusted over the desired dispersion range and operating band is determined based on the desired use. Next, the maximum wavelength increase and associated maximum tensile strain required to tune the preliminary optical grating across the desired operating range is determined. Next, a final optical grating is selected, wherein at each location in the final optical grating the reflected wavelength is longer than the wavelength in the preliminary optical grating design by the previously determined maximum wavelength increase.

After the final optical grating is selected using the above steps, a support member 30, such as a straight beam having a uniform cross-section, is provided. While still separated from the optical waveguide 10 having the selected final optical grating 16, a support surface 32 of support member 30 is elongated in a controlled manner (FIG. 2A) as indicated by arrows 38. Support surface 32 may be elongated in a controlled manner by imparting a controlled tensile strain to support member 30. A controlled tensile strain may be imparted by the application of mechanical force to support member 30, such as by bending the support member 30 in a controlled arc having a constant bend radius by the application of a uniform bending moment across the length of the support member 30. Alternately, a controlled tensile strain may be imparted by stretching the support member 30. Alternately, support surface 32 may be elongated in a controlled manner by applying a controlled temperature change to the support member 30, so long as support member 30 has a non-zero coefficient of thermal expansion.

After support surface 32 of support member 30 is elongated by a predetermined distance (either by the application of controlled strain or the application of controlled heating/cooling), the substantially unstrained optical waveguide 10 and its associated grating 16 is securely attached along its entire length to the elongated support surface 32 of support member 30, such that no relative movement between the support surface 32 and the grating 16 is permitted (FIG. 2B). The optical waveguide grating 16 is attached to the elongated support surface 32 of the support member 30 such that the longitudinal axis of the grating 16 is in alignment with the direction of the controlled elongation in the support surface 32. The optical waveguide grating 16 may be attached to the support member 30 in a variety of acceptable manners, for example, with adhesive, solder or mechanical clamping devices.

After the optical waveguide 10 and associated grating 16 are securely attached to the surface 32 of support member 30, the mechanical or thermal conditions causing elongation of the, support surface 32 are removed. As support surface 32 returns to its shorter, pre-elongated condition, a compressive axial strain (the compressive preload) indicated by arrows 40 is applied to the attached optical waveguide 10 and associated grating 16 (FIG. 2C).

The spectral response (wavelength and/or chromatic dispersion) of the axially compressed grating 16 may subsequently be adjusted (i.e., "tuned") by application of a strain and/or temperature distribution on the support member 30 along the length of the grating 16. The application of a strain and/or temperature distribution on the support member 30 along the length of the grating 16 imparts a corresponding tensile strain in the grating 16, which alters both the index of refraction of the grating 16 and the spacing of grating elements 18. The controlled application of a strain and/or temperature distribution thus allows the wavelength and/or the chromatic dispersion characteristics of the grating 16 to be adjusted to achieve a desired spectral response.

In one embodiment according to the invention, the controlled extension of support surface 32 is sufficient to cause the magnitude of the compressive axial strain on the grating 16 to be equal to or greater than the previously determined maximum tensile strain required to achieve the maximum wavelength change in the grating 16.

In an alternate embodiment according to the invention, the support member 30 is made from a material having a coefficient of thermal expansion (CTE) different from the CTE of the optical waveguide 10 and associated grating 16. Instead of applying a controlled strain to elongate surface 32 of the support member 30 (such as by bending or stretching the support member 30 as described above), a thermal load is applied to the support member. The support member 30 is heated (or cooled) by the thermal load to a temperature at which the differential expansion of the support member 30 and the grating 16 results in a compressive axial strain on the grating 16 when the thermal load is removed. In a preferred embodiment, the magnitude of the compressive axial strain is equal to or greater than the maximum tensile stress that might occur over the operating temperature range of the apparatus in order to achieve the maximum wavelength change.

Thus, in a preferred method of adjusting the spectral response of the grating 16, the compressive axial strain (the compressive preload) applied to the grating 16 prior to tuning has a magnitude equal to or greater than the magnitude of a maximum tensile strain imparted to the grating 16 during subsequent tuning operations. In this manner, during subsequent tuning, the optical waveguide 10 and grating 16 do not experience axial tension, and therefore are not subject to tensile failure.

Figure 3:
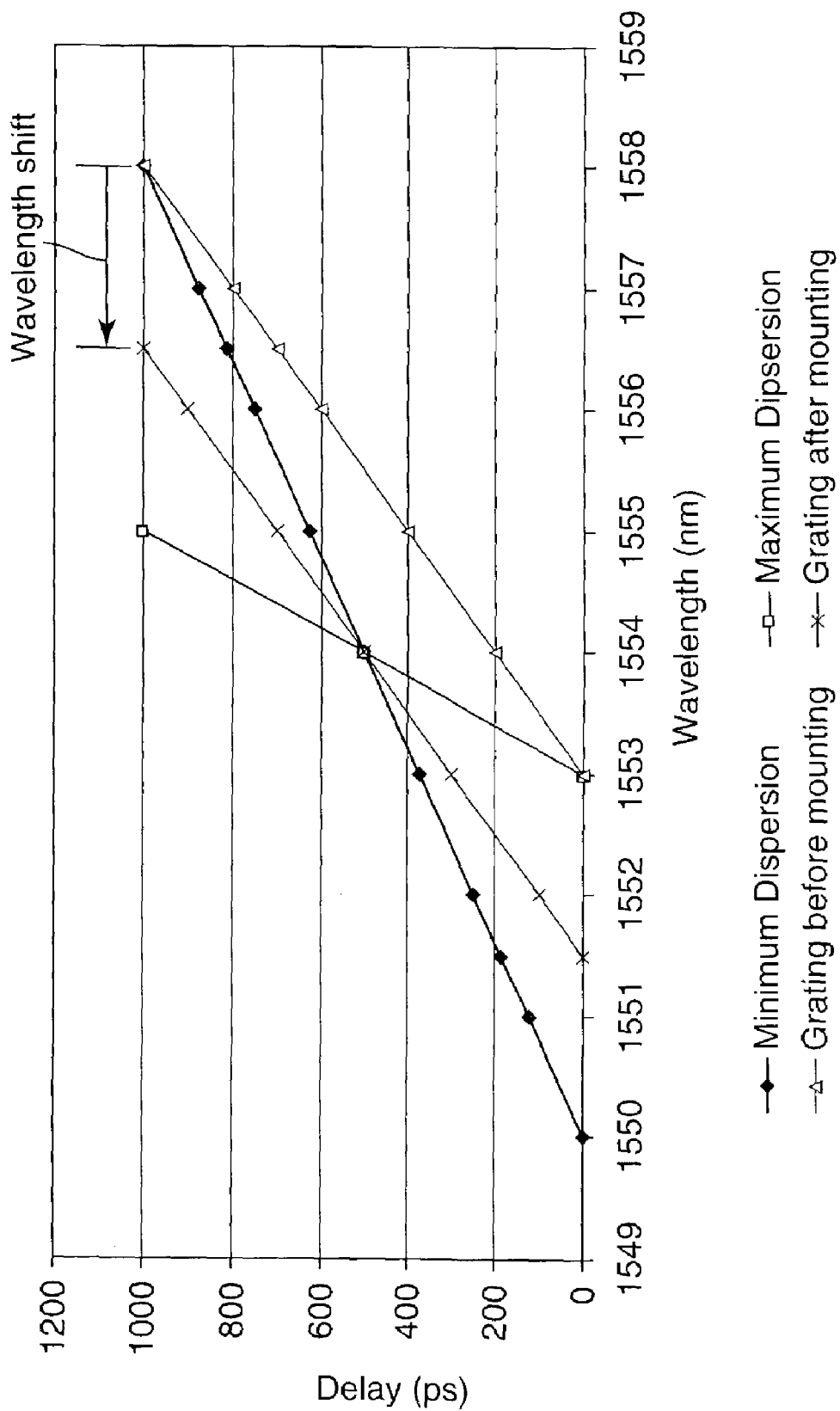
FIG. 3 illustrates the performance of an apparatus for adjusting the spectral response of an optical waveguide grating like that illustrated in FIGS. 2A–2C.

An exemplary application of the method for adjusting the spectral response of a grating is as follows. First, assume a glass grating length of 100 mm and a round trip delay in the glass grating of 10 ps/mm (delay=2×speed of light×effective refractive index). Thus, the maximum delay (from the near end of the grating to the far end of the grating and back to the near end) is 1000 ps. Next, as illustrated in the graph of FIG. 3, assume that the grating will be tuned around a constant center wavelength of 1554 nm, the maximum desired dispersion is 500 ps/nm, and the minimum desired dispersion is 125 ps/nm. Then, the maximum tensile strain required to tune the grating across the desired operating range is determined by the equation:

$$\text{required strain} = \frac{\Delta \lambda}{\lambda_{\max}(1 - p_e)}$$

Thus, the Required Strain=1.5/[1554*(1−0.24)]=0.13%. Therefore, a 0.13% tensile strain is applied to the support beam prior to attachment of the grating, either by simple tension or bending of the support member. After attaching the grating, the tensile strain is removed from the support member, with the result being an axially compressive force and the elimination of tension in the waveguide. This example assumes the mechanical strength of the grating is negligible relative to the strength of the support beam.

Bending Moments

Another aspect of the present invention provides an apparatus and method for adjusting the spectral response of an optical grating through the application of a pair of bending moments. The pair of bending moments co-operate to create a controlled bending moment gradient over a section of a support member to which the optical grating is attached. The apparatus and method that embodies this aspect of the invention are useful for mechanically tuning optical waveguide gratings of any length, or a selected portion of any length of optical waveguide grating. Because the apparatus and method can tune a selected portion of an optical waveguide grating, they are beneficially used for tuning a selected channel or channels in a multi-channel grating. Specifically, they are beneficially used in a broadband wavelength division multiplexed (WDM) optical system having a plurality of optical wavelength channels.

One embodiment of an apparatus 100 for adjusting the spectral response of an optical waveguide grating is illustrated in FIG. 4. The apparatus has attached to it a broadband optical grating 116 having an operating bandwidth encompassing a plurality of channels (wavelengths). The optical grating 116 may be chirped, and may be of any suitable type of grating. For example, the grating may be a fiber Bragg grating, or a long period grating. The grating 116 is attached to a support member 130 (which is a flat beam in this illustration). A bending moment applicator 140 is configured to apply two bending moments to the support member 130. The grating 116 and support member 130 are moveable with respect to bending moment applicator 140. The bending moment applicator 140 includes a base 142 having two rotatable discs 144, 146 attached thereto. Each disc 144, 146 has two pairs of pins 150 (for a total of four pins 150 on each disc 144, 146) projecting therefrom, in a direction normal to the plane of rotation of the discs 144, 146. The support member 130 and attached grating 116 are positioned between each pair of pins 150, such that rotation of the discs 144, 146 causes one pin 150 of each pair of pins to apply a force to the support member 130. A thumbwheel 160 and worm gear 162 are associated with each disc 144, 146. As either of the thumbwheels 160 are rotated, the worm gear 162 causes the associated disc 144, 146 to rotate. As the discs 144, 146 rotates, forces are applied to the support member 130 via pins 150, thereby creating a bending moment gradient in support member 130 between the discs 144, 146. In the embodiment illustrated in FIG. 4, both the right and left discs 144, 146, respectively, have been rotated clockwise. In this case, the grating 116 sees a linear strain gradient between the discs 144, 146. The maximum axial compression on the grating 116 is adjacent to the downward pushing right pin of the left disc 144 and the maximum tension is adjacent to the upward pushing left pin on the right disc 146. Although eight pins 150 are shown on the two discs, it should be noted that at any point in time only four of the pins 150 are applying force to the beam 130.

In one embodiment according to the invention, the bending moment applicator 140 is configured to apply the two bending moments to the support member 130 separated by a distance less than the length of the optical grating 116. The distance separating the application points of the bending moments may be selected so that only a single channel of the plurality of channels, or a subset of the plurality of channels, in the optical grating 116 are tuned. In this embodiment, the bending moment applicator 140 is preferably moveable with respect to the support member 130 and optical grating 116, such that the application points of each of the bending moments can be independently adjusted to tune the spectral response of any desired channel(s) of the broadband optical grating 116.

In another embodiment according to the invention, the bending moment applicator 140 is configured to apply the two bending moments to the support member separated by a distance equal to or greater than the length of the optical grating 116. In this configuration, the bending moments can be adjusted to tune the spectral response of the entire grating 116.

Embodiments of the invention may employ axial pre-compression of the optical grating in addition to the application of a pair of bending moments to the support member As described above, the optical grating 116 may be attached to the support member 130 such that the support member 130 axially compresses the optical grating 116. Preferably, the compressive axial strain (the compressive preload) applied to the optical grating 116 has a magnitude equal to or greater than the magnitude of a maximum tensile strain imparted to the grating during subsequent tuning operations using the application of a pair of bending moments.

FIG. 5 illustrates another embodiment of the present invention, an apparatus 200 for adjusting the spectral response of an optical waveguide grating. In the apparatus 200 of FIG. 5, the relationship between the two bending moments is fixed so that the dispersion of an optical waveguide grating 216 is changed, but not the center wavelength. The apparatus of FIG. 5 includes the grating 216 attached to a flat beam support member 230. The optical grating 216 and support member 230 are moveable with respect a bending moment applicator 240. The bending moment applicator 240 includes a housing 242 having guide members 244 adjacent both sides of the housing 242. The support member 230 and attached grating 216 extend across the housing 242 and are positioned between the guide members 244. To apply a moment to the grating 216, a thumbwheel 250 turns a lead screw 252, which in turn moves a cam 260 to the left or right of its normal centered location in the housing 242. The cam's angled cam surfaces 262 contact a movable central part 264, which rotates about a pivot point 266. Pins 270 mounted symmetrically about the pivot point 266 provide bending forces to the flat support beam 230. In one embodiment, a portion of the cam 260 is exposed through the top surface 276 of the housing 242, so that the position of the cam 260 relative to the housing 242 can be used to determine the current tuning amount.

FIG. 6 illustrates apparatus 200 of FIG. 5 slidably mounted on rails 302 of an assembly 300. Assembly 300 includes a long grating 316 on a support beam 330. In use, the apparatus 200 is moved to a position centered over a selected point in the grating that reflects a known wavelength that becomes the center wavelength of the tuned region. The apparatus 200 is then secured in position on rails 302 of assembly 300 and the chromatic dispersion immediately around the selected center wavelength is adjusted using the thumbwheel 250.

FIG. 7 illustrates a test jig 400 for applying bending moments to a supporting beam 430. Test jig 400 includes guide pins 450 mounted on stationary base 451, and a rotating disk 452 mounted on base 451. Application of a force, F, to the end of the tuning rod 440 causes disk 452 to rotate. Rotating disk 452 includes pins 453, 454, 455, 456 to apply bending moments to beam 430 and the grating 416 thereon. The bending moments created by the test jig 400 create strain profiles identical to the apparatus 200 of FIG. 5.

Figure 8:
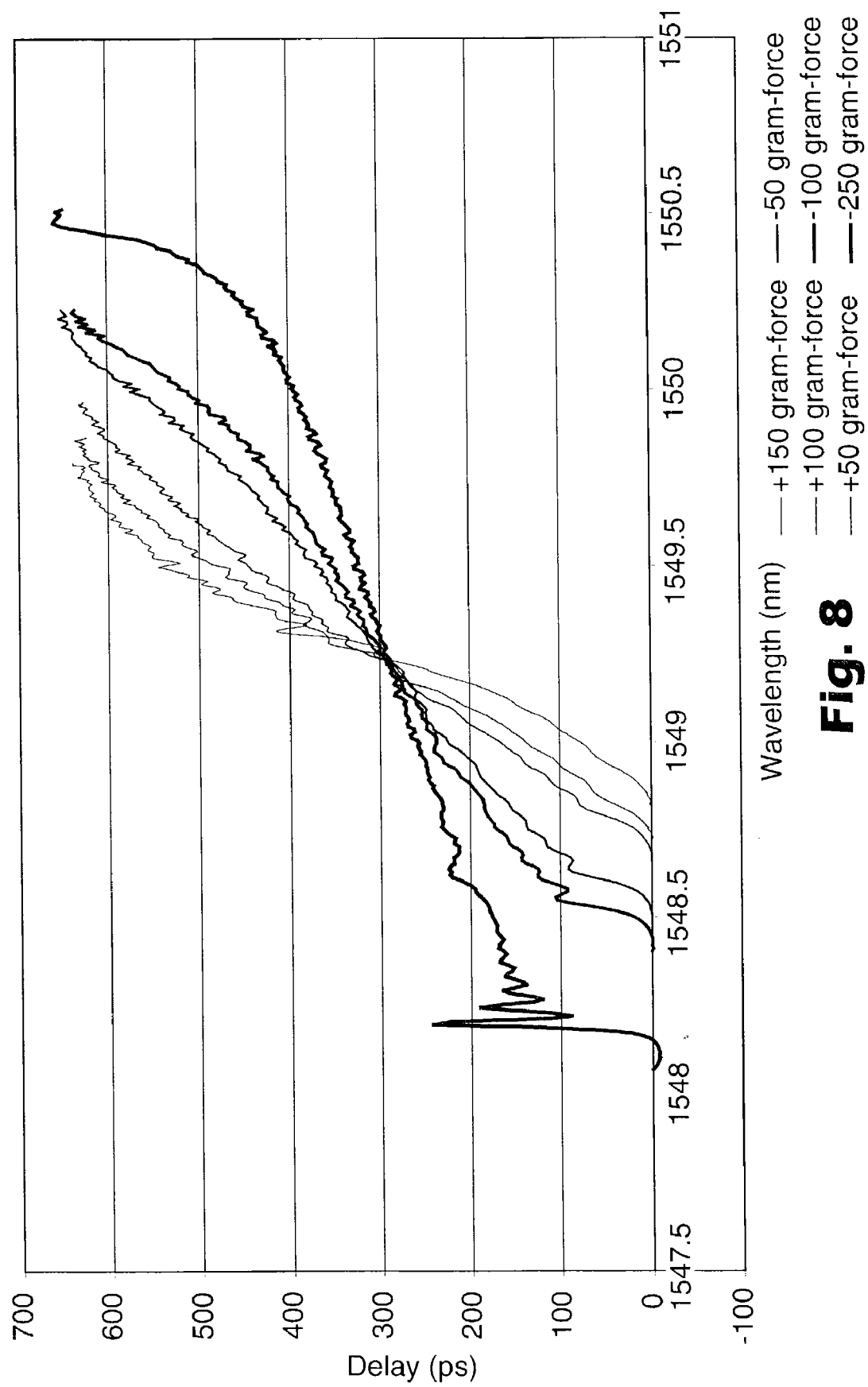
FIG. 8 illustrates the adjustment of the spectral response of a Bragg grating using the apparatus FIG. 7.

FIG. 8 illustrates the chromatic dispersion tuning of a Bragg grating written at 430 ps/nm and adjusted using the test jig 400 shown in FIG. 7. The six lines represent six different magnitudes of force applied to the end of the tuning rod 440. As can be seen, the dispersion (slope of the delay curves) around the central wavelength is effectively adjusted using this method. In this example, the chromatic dispersion was adjusted down to a minimum of 130 ps/mn, and up to a maximum of 1040 ps/nm. In the variously described embodiments according to the invention, the support member 130, 230, 330 may optionally be formed of a material having a coefficient of thermal expansion (CTE) below approximately 5 ppm/C°. A low CTE minimizes changes in the spectral response of a grating due to thermal conditions, and is desirable where the device is not intended to be thermally responsive. For example, the support member 130 may be formed of graphite, graphite composite materials, metal alloy materials, especially nickel alloy materials, and the like. Suitable nickel alloy materials include those available under the trade names INVAR (36% nickel, about 63% iron, and less than 1% total of manganese, silicon, and carbon) and KOVAR (29% nickel, 17% cobalt, about 53.5% iron, and about 0.5% total of manganese, silicon, and carbon.

Figure 9:
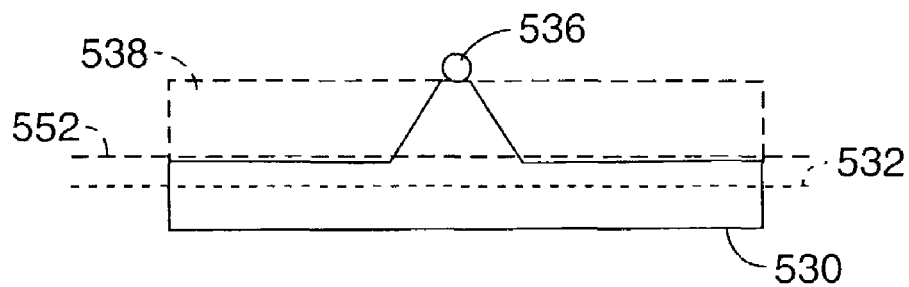
FIG. 9 illustrates a support member that is asymmetric about its neutral axis.

Although the support members 130, 230, 330 described so far have symmetric cross-sections, the support member may alternately be asymmetric about its neutral axis. For example, a support member 530 illustrated in FIG. 9 is asymmetric about its neutral axis 532. The optical grating 536 is attached to the asymmetric support member 530 at a region most distant from the neutral axis 532. As used herein, the neutral axis is the line or plane in a support member under transverse pressure, at which the support member is neither stretched nor compressed (i.e., where the longitudinal stress is zero). Depending upon the shape (cross-section) of the support member, the neutral axis may be, but is not necessarily, colinear with the centroidal axis. As used herein, the centroidal axis connects the centroids of an envelope 538 encompassing the cross sections of the support member. The support member is said to be straight or curved in accordance with the shape of its centroidal axis. An asymmetric support member shape as shown in FIG. 9 has the grating 536 placed at a relatively large distance from the neutral axis 532, as compared to the size of grating 536. When a vertical bending moment is applied, this large distance provides a larger ratio of strain per unit bending moment than symmetric support member designs. The asymmetric support member shape also results in a lower average strain on the support member material than a symmetric support member shape.

Figure 10:
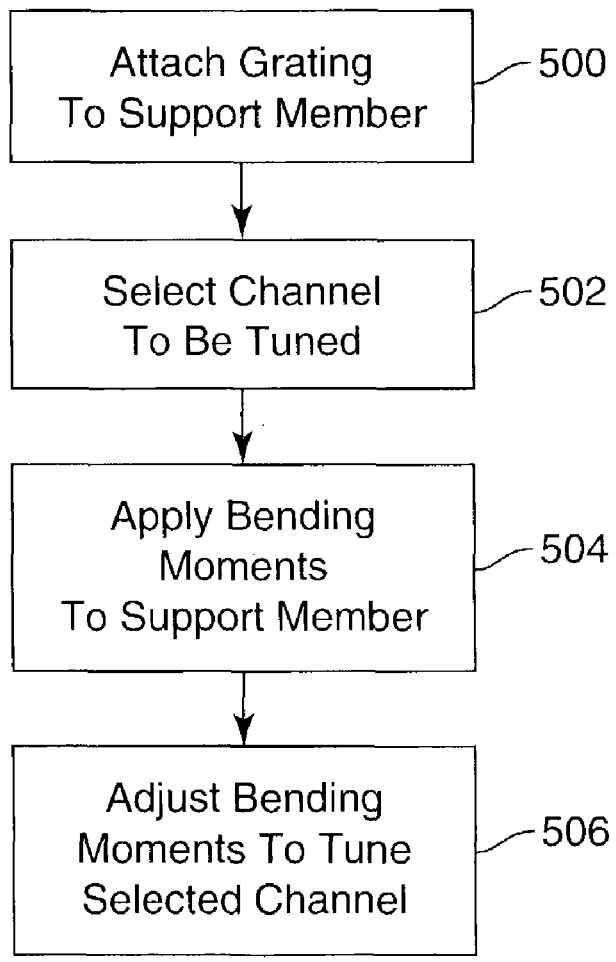
FIG. 10 illustrates one method of tuning the spectral response of an optical waveguide grating or section thereof according the to invention.

A method of tuning the spectral response of an optical grating or section thereof according to the invention is illustrated in FIG. 10. First, the optical grating is attached to support member (step 500). The grating may optionally be attached to the support member such that the support member axially compresses the grating, as described above. The grating is attached to the support member along its length, typically parallel to and spaced from a centroidal axis 552 of the support member. The support member preferably has a uniform cross-section along the length of the optical grating.

Next, a portion of the grating that will have its spectral response adjusted or "tuned" is selected (step 502). Typically, the selected portion of the grating will be centered about a single channel or wavelength to be adjusted. However, the selected portion may encompass a plurality of channels, and may include the entire length of the grating.

The support member is next deformed by applying a pair of bending moments (operating on the support member) at some distance from each other (step 504). The location of the bending moments is selected such that one bending moment is applied adjacent to one end of the adjusted region and the other bending moment is applied adjacent the other end of the adjusted region. Application of the bending moments on the support member creates an axial strain profile along the length of grating, and thereby altering the spectral response of the grating within the adjusted region.

As the bending moments are applied, the spectral response of the grating can be monitored. The magnitude and location of one or more of the bending moments can then be adjusted independently and dynamically to tune the spectral response of the optical grating until a desired spectral response is achieved (step 506).

For example, assume the objective is to tune a uniformly chirped grating to provide −1300 ps/nm dispersion in the 1 nm band from 1550 nm to 1551 nm. The two bending moments could be spaced apart by a distance of approximately 130 mm. The moment at one end of the band would then be adjusted to result in the grating located at that position reflecting the 1551 nm wavelength and the moment at the other end of the band would then be adjusted so that the grating would reflect the 1550 nm wavelength at that position. That is, the wavelength is set at each of two points in the grating, with the result being a defined channel width and dispersion. In actual practice, the tuned band would typically include a safety margin and be somewhat larger and than the band of the optical signal.

Figure 11:
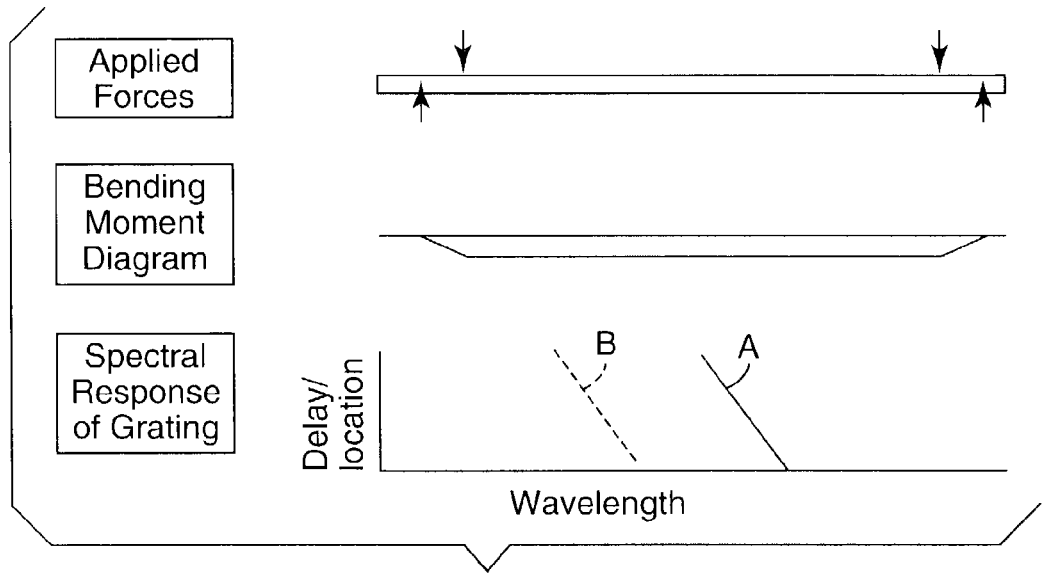
FIG. 11 illustrates uniformly shifting the spectral response of an optical waveguide grating.
Figure 12:
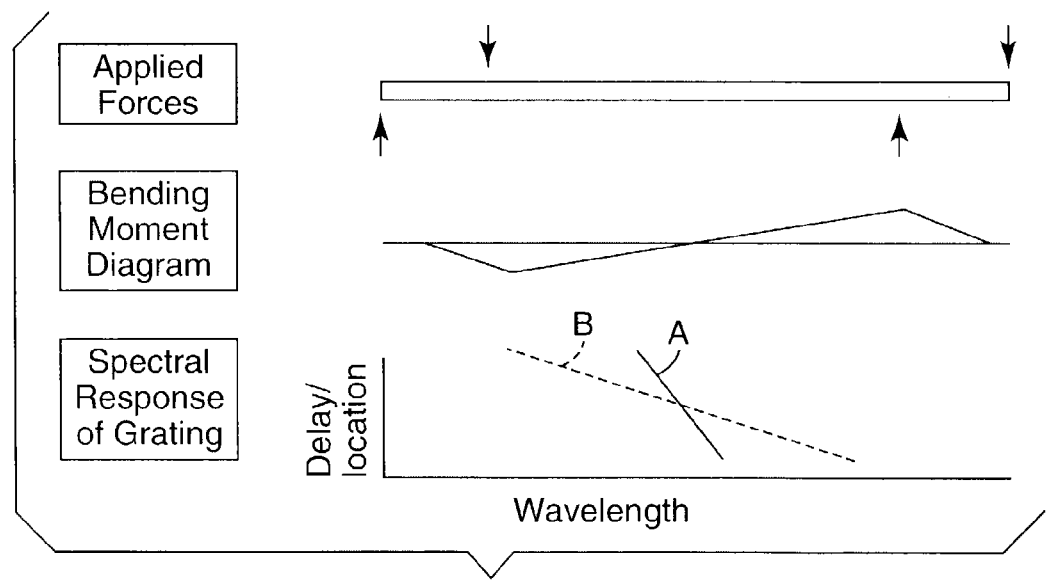
FIG. 12 illustrates altering the chromatic dispersion of an optical waveguide grating.
Figure 13:
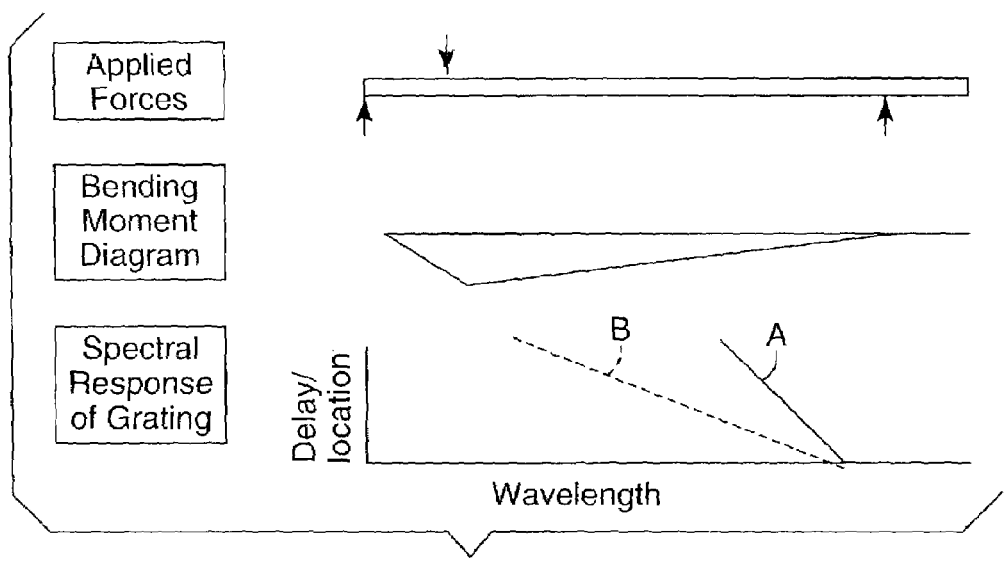
FIG. 13 illustrates altering the center wavelength and the chromatic dispersion of an optical waveguide grating.

Various combinations of bending moments and the resulting change in the spectral response of the grating are illustrated in FIGS. 11–13. In each of FIGS. 11–13, the "original" spectral response is shown as solid line "A", while the "adjusted" spectral response is shown as dashed line "B". Depending upon how the bending moments are applied, altering the spectral response of the optical grating may include uniformly shifting spectral response (i.e., center wavelength and chromatic dispersion) of the grating,(FIG. 11), altering the chromatic dispersion of the grating (FIG. 12), or shifting the center wavelength and also altering the chromatic dispersion of the optical grating (FIG. 13).

In each of the illustrated examples, a chirped grating is attached to the top surface of a support beam, the short wavelength end of the grating is to the left side of the diagram and light is launched into the grating from the right side of the diagram. In each case the delay vs. wavelength chart represents only the length of grating between the innermost force application points.

FIG. 11 illustrates uniformly shifting the spectral response of the grating. Specifically, the center wavelength and dispersion of the grating has shifted as a result of four equal forces creating equal and opposite moments near the ends the support beam.

FIG. 12 illustrates altering or tuning the chromatic dispersion of the grating. The four forces are configured so that the moment created by the inside forces is equal and opposite to the moment created by the outside forces. This results in a uniform moment gradient between the inner two force application points and results in a change in the chromatic dispersion of the grating, while the center wavelength stays the same.

FIG. 13 illustrates a combination of wavelength shift and chromatic dispersion tuning achieved by superimposing the examples of FIGS. 10 and 11. In this superposition of forces, the clockwise and counterclockwise moments at the right end of the beam tend to cancel resulting in only a small upward force. The magnitude and direction of the bending moment at each location along the grating are proportional to the wavelength shift at that location.

As noted above, the "two-moment" apparatus and method disclosed herein can be used to tune the spectral response of an optical waveguide grating over any portion of the grating, including the full length of a grating. However, for a long grating, the change in spectral response per unit strain would be small. Achieving a meaningful or useful change in the spectral response would require a large strain on the fiber. In many applications, it is beneficial to tune a single channel within a multi-channel grating, or independently tune two or more different channels within a long multi channel grating. This objective can be easily achieved using the apparatus and method disclosed herein, because adjusting the spectral response of only a portion of a grating requires a lower average/peak strain than needed to tune the full length of the grating.

Bend and Rotate

Another aspect of the present invention provides an apparatus and method for adjusting the spectral response of an optical grating by attaching the grating to a longitudinal support member, applying a bending moment to the support member to create a bend or curve in the support member, and then rotating the support member about its centroidal axis. As the support member is rotated, depending upon its initial position on support member, the grating moves from an area of tension on the outside of the support member bend to an area of compression on the inside of the support member bend (thus reflecting a shorter wavelength), or alternately move from the inside of the support member bend outward (and thus reflecting longer wavelengths).

Figure 14:
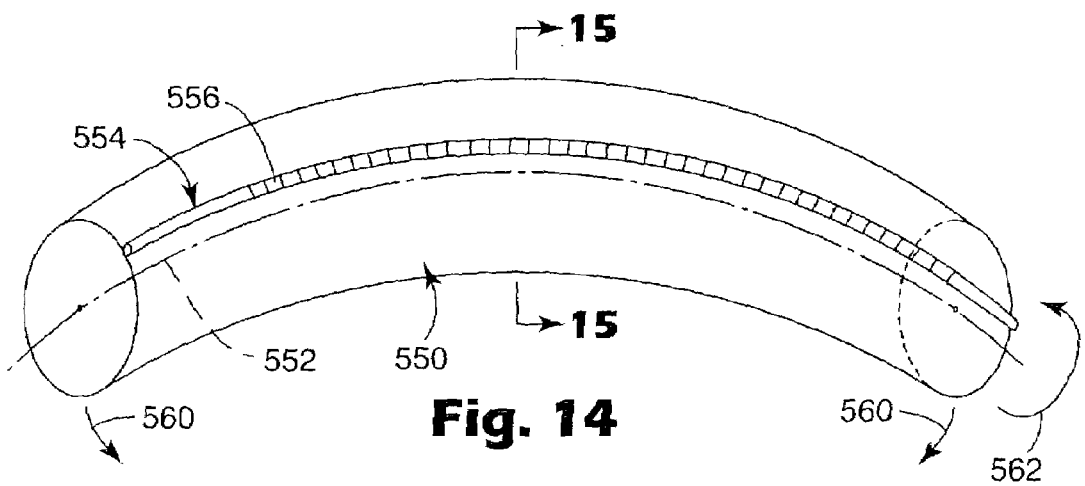
FIG. 14 illustrates an embodiment of an apparatus for adjusting the spectral response of an optical waveguide grating that is adjusted by bending and rotating the support member according to the invention.

One exemplary embodiment of an apparatus for adjusting the spectral response of an optical waveguide grating according to the invention is illustrated in FIG. 14. A strain-imparting support member 550 (in this exemplary embodiment a longitudinal rod having a circular cross-section) is configured for simultaneous longitudinal bending and rotating about its centroidal axis 552. A longitudinal optical waveguide 554 containing a grating 556 is attached along its entire length to the strain-imparting support member 550. In one embodiment according to the invention, the grating 556 is a long optical grating, and has a length of at least 100 mm. In another embodiment according to the invention, the long optical grating has a length of at least 1 m.

The support member 550 is operatively coupled to a mechanism (pot shown) for bending and rotating the support member. The mechanism applies a bending moment 560 to the support member 550 for longitudinally bending the support member. The support member 550 is then rotated (as indicated by arrow 562) about its now curved or bent centroidal axis 552 to adjust the center wavelength of the grating 556.

In one embodiment according to the invention, the support member 550 bends and/or rotates as a function of temperature, such that the apparatus is suitable for use as a thermal compensation package. The thermally responsive bending and/or rotating may be accomplished by selecting the material of the support member 550 to be responsive to temperature changes, or by configuring the mechanism for bending and rotating to be responsive to temperature changes, or a combination of both.

The grating 556 and associated waveguide 554 may be attached to the support member 550 in several different orientations. In one embodiment according to the invention, as illustrated in FIG. 14, the longitudinal axis of the grating 556 is parallel to the centroidal axis 552 of the support member 550. In this orientation, the mechanism for bending and rotating the support member 550 about its centroidal axis 552 tunes the wavelength of the optical grating 556 by controlling the longitudinal bending and rotating of the strain-imparting support member in accordance with the equation:

$$\lambda = \lambda_o[1+(1-P)r\cos(\theta)/R]$$

Figure 15:
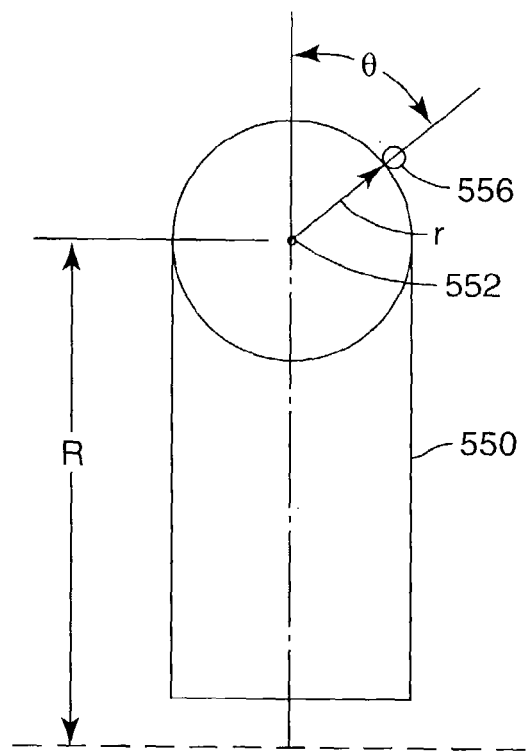
FIG. 15 is a cross sectional view along line 15—15 of the apparatus of FIG. 14.

Where:
$\lambda_o$=unstrained wavelength of the grating;
P=the strain optic coefficient of the grating;
R=radius of the bend in the support member;
r=radial distance from the centroidal axis to the core of the grating; and
$\theta$=angle of rotation about the centroidal axis (as shown in FIG. 15).

Figure 16:
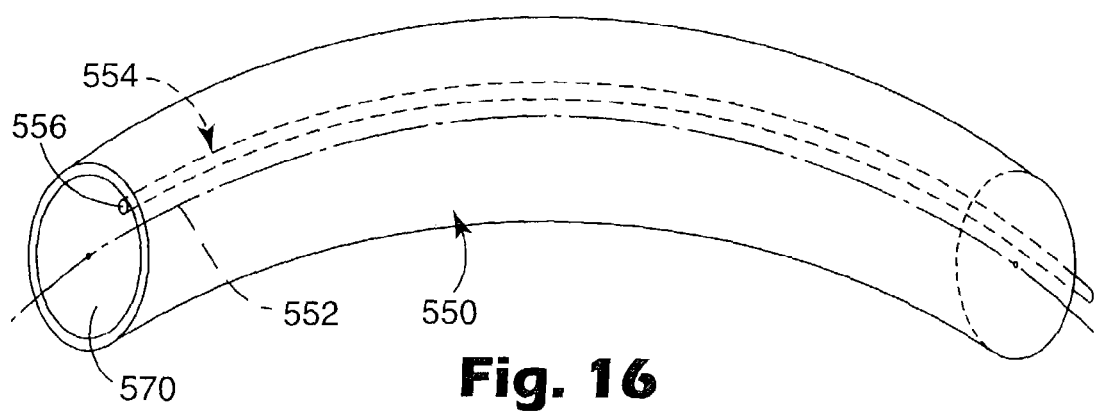
FIG. 16 illustrates yet another embodiment of an apparatus for adjusting the spectral response of an optical waveguide grating that is adjusted by bending and rotating the support member according to the invention.

In another embodiment according to the invention, as illustrated in FIG. 16, the support member 550 has a cavity 570 extending longitudinally therethrough. The grating 556 is positioned within the cavity 570 in the support member. In the embodiment of FIG. 16, the cavity 570 extending through the support member 550 is parallel to the centroidal axis 552 of the support member. In that instance, the mechanism for longitudinally bending and rotating the tubular support member 550 about its centroidal axis 552 tunes the wavelength of the optical grating 556 by controlling the longitudinal bending and rotating of the support member in accordance with the equation provided above.

Figure 17:
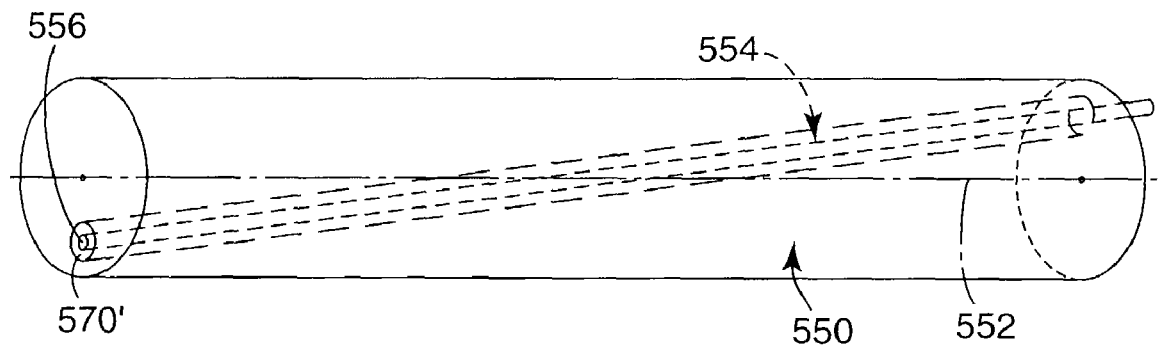
FIG. 17 illustrates yet another embodiment of an apparatus for adjusting the spectral response of an optical waveguide grating that is adjusted by bending and rotating the support member according to the invention.

In another embodiment according to the invention, as illustrated in FIG. 17, the support member 550 has a cavity 570' extending longitudinally therethrough that intersects the centroidal axis 552 of the support member and/or is not parallel to the centroidal axis 552 of the support member. Support member 550 is shown in an unbent condition, so that the relationship between cavity 570' and centroidal axis 552 may be clearly seen. The longitudinal axis of the grating 556 is positioned within the longitudinal cavity 570' in the support member. Because the longitudinal cavity 570' of the support member 550 is no longer parallel to the centroidal axis 552 of the support member, the result of bending and rotating support member 550 is not a simple wavelength shift in the spectral response of the grating. The mechanism for longitudinally bending and rotating the support member about its centroidal axis 552 tunes the wavelength of the optical grating 556 by controlling the longitudinal bending and rotating of the support member in accordance with the equation provided above. However, the value of r is equal to the distance between the centroidal axis 552 of the support member 550 and the grating 556, and changes as a function of location along the grating 556. In the case shown where the grating crosses the centroidal axis of the support member, subsequent bending and rotation does not change the wavelength at the crossing point, but changes the dispersion over the length of the grating.

In another embodiment according to the invention, the longitudinal axis of the grating 556 is wound about the centroidal axis 552 of the support member 550. In the exemplary embodiment of FIG. 18A, an optical waveguide 554 having an optical grating 556 is helically wound about the centroidal axis 552 of a longitudinal support member 550 having a circular cross-section. In this orientation between grating 556 and centroidal axis 552, the result of bending and rotating support member 550 is not a simple wavelength shift. Instead, when the support member 550 is bent, some sections of the grating 556 are placed in tension (on the "outside" of the bend) and other areas of the grating 556 are placed in compression (on the "inside" of the bend). The spectral response is thus modulated in a manner that correlates to the helix angle ($\alpha$) of the grating 556 as it winds around support member 550. The mechanism for bending and rotating the support member 550 about its centroidal axis 552 tunes the wavelength of the optical grating 556 by controlling the longitudinal bending and rotating of the strain-imparting support member in accordance with the equation provided above. However, the angle of rotation ($\theta$) becomes a function of location on the grating 556 and will therefore vary for each point along the grating.

Figure 18A:
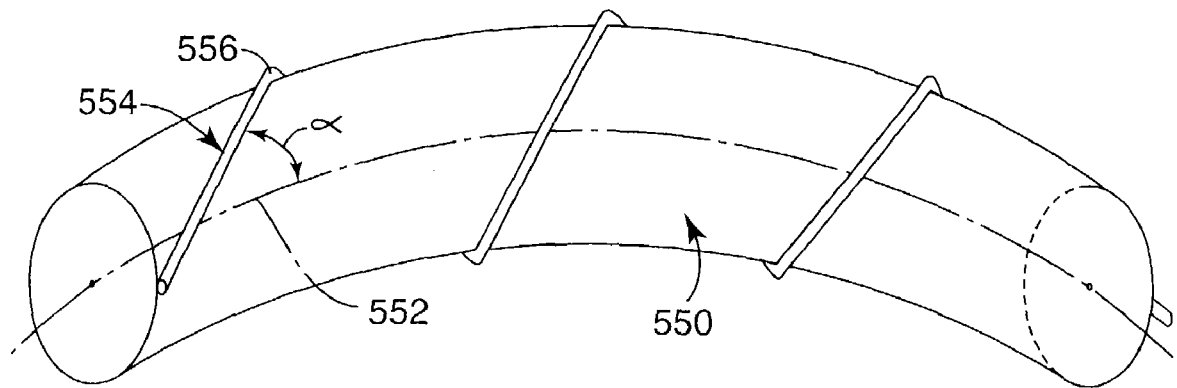
FIGS. 18A and 18B illustrate additional embodiments of an apparatus for adjusting the spectral response of an optical waveguide grating that are adjusted by bending and rotating the support member according to the invention.
Figure 19A:
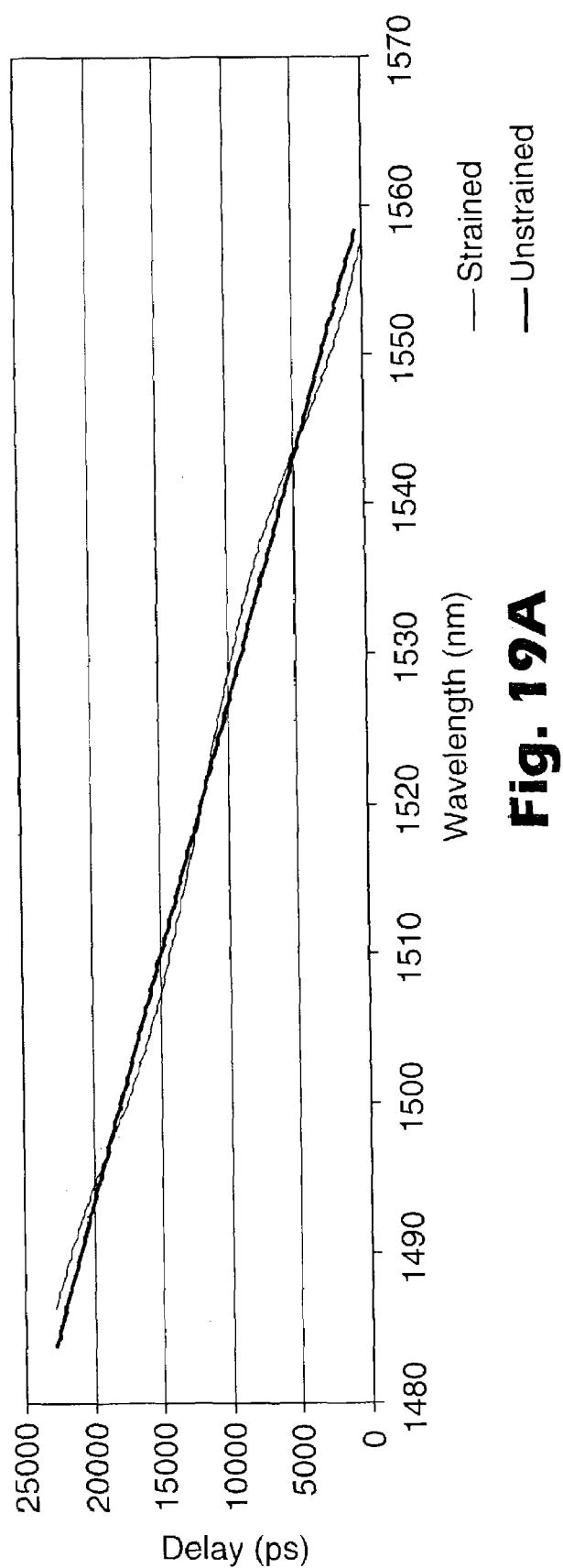
FIGS. 19A–19E illustrate the delay slope and dispersion curves of the apparatuses of FIGS. 18A and 18B.
Figure 19B:
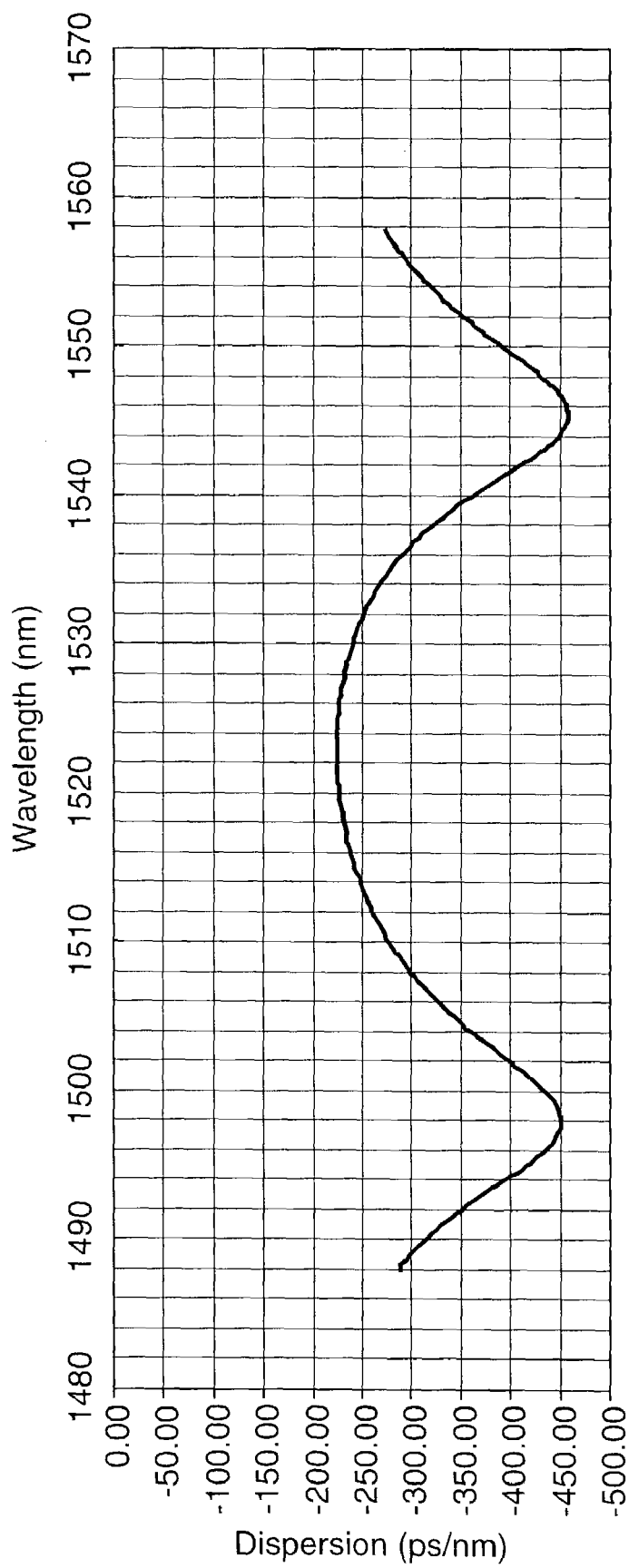

As an example, assume that the unstrained grating 556 of FIG. 18A has a uniform dispersion (i.e., the delay slope is constant) before the support member 550 is bent. Then, it can be seen in the graph of FIG. 19A that bending the support member 550 results in a modulation around the initial (unstrained) delay line. Since dispersion is defined as the slope of the delay line, it is clear that the dispersion changes as a function of the position in the grating 556. The graph of FIG. 19B shows the dispersion of the grating 556 as a function of wavelength and relates to the strain distribution used to generate the graph of FIG. 19A. By rotating the support member 550 without changing the radius of the bend, the dispersion at any wavelength will vary between the extremes shown in FIG. 19B. Thus a single wavelength or narrow band within the bandwidth of the grating 556 may readily have its dispersion adjusted. This embodiment thus provides the ability to tune only a selected section of a grating 556.

To avoid the creation of etalons in an optical waveguide grating (as is typically preferred in a grating-based dispersion compensation filter), the intrinsic chirp of the grating should be greater than the strain induced chirp caused by bending of the support member. This can be achieved by assuring that the following relationship is maintained:

Intrinsic Chirp$>\lambda_o*(1-P)*\sin(\alpha)/R$

Where:
$\lambda_o$=unstrained wavelength of the grating;
P=the strain optic coefficient of the grating;
$\alpha$=the helix angle (the angle between the fiber grating and the axis of the support member);
R=radius of the bend in the support member.

For example; assume a grating written with a dispersion of 500 ps/nm has an intrinsic chirp of about 20 nm of wavelength shift per meter of grating length (intrinsic chirp=20 nm/m). Further assume a maximum wavelength of approximately 1600 nm ($\lambda_o$=1600 nm). The strain optic coefficient of a silica fiber is approximately 0.24 (P=0.24). If one desires to bend the support member in an arc having a radius of 2 meters (R=2 m), then using the relationship given above, the helix angle a should not exceed about 1.8 degrees.

If the bend in the support member has a larger radius, a larger helix angle may be used. For example, using the same grating as in the example above, and a bend radius of 5 meters, the helix angle should not exceed about 4.6 degrees.

Figure 19C:
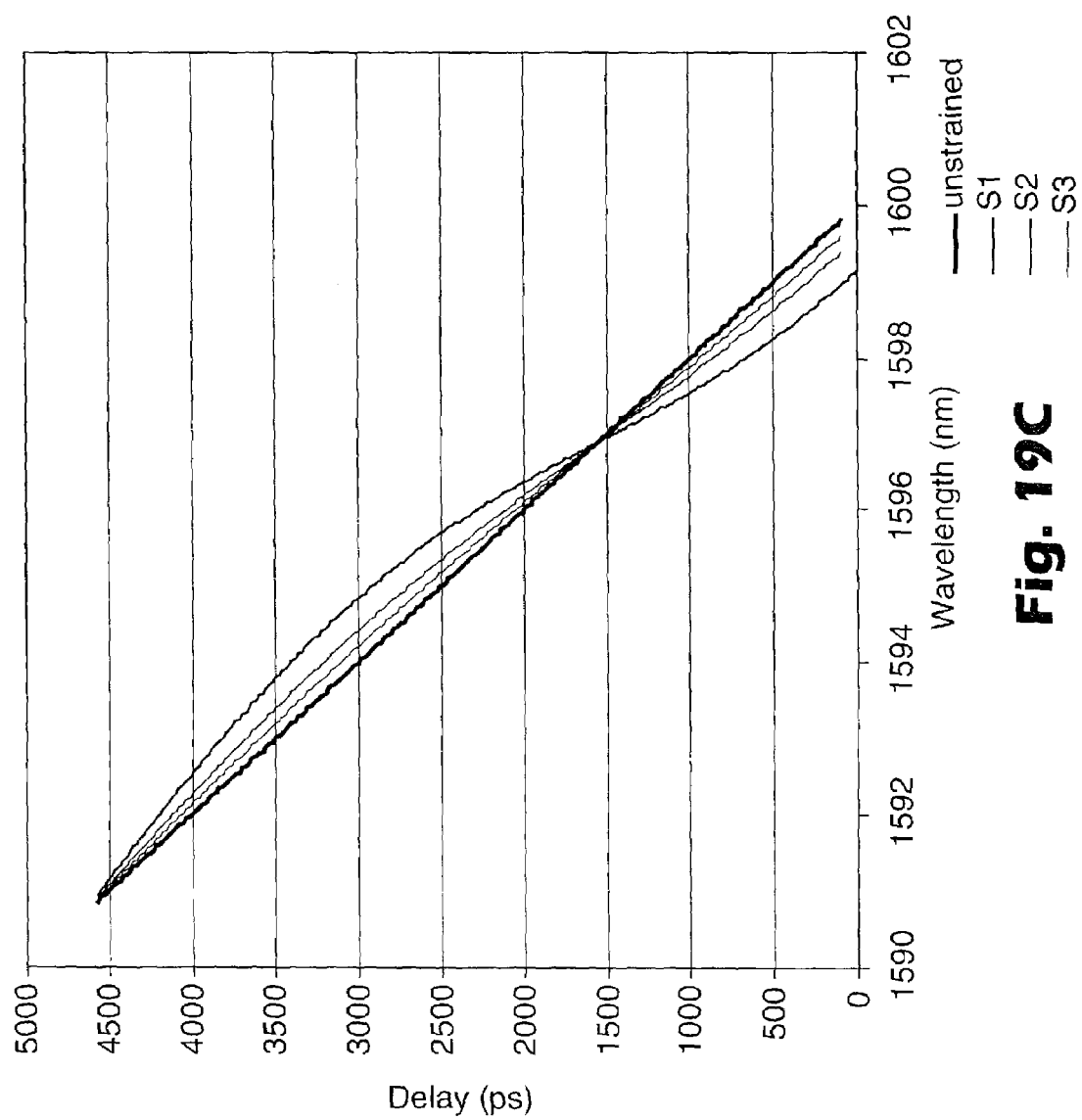
Figure 19D:
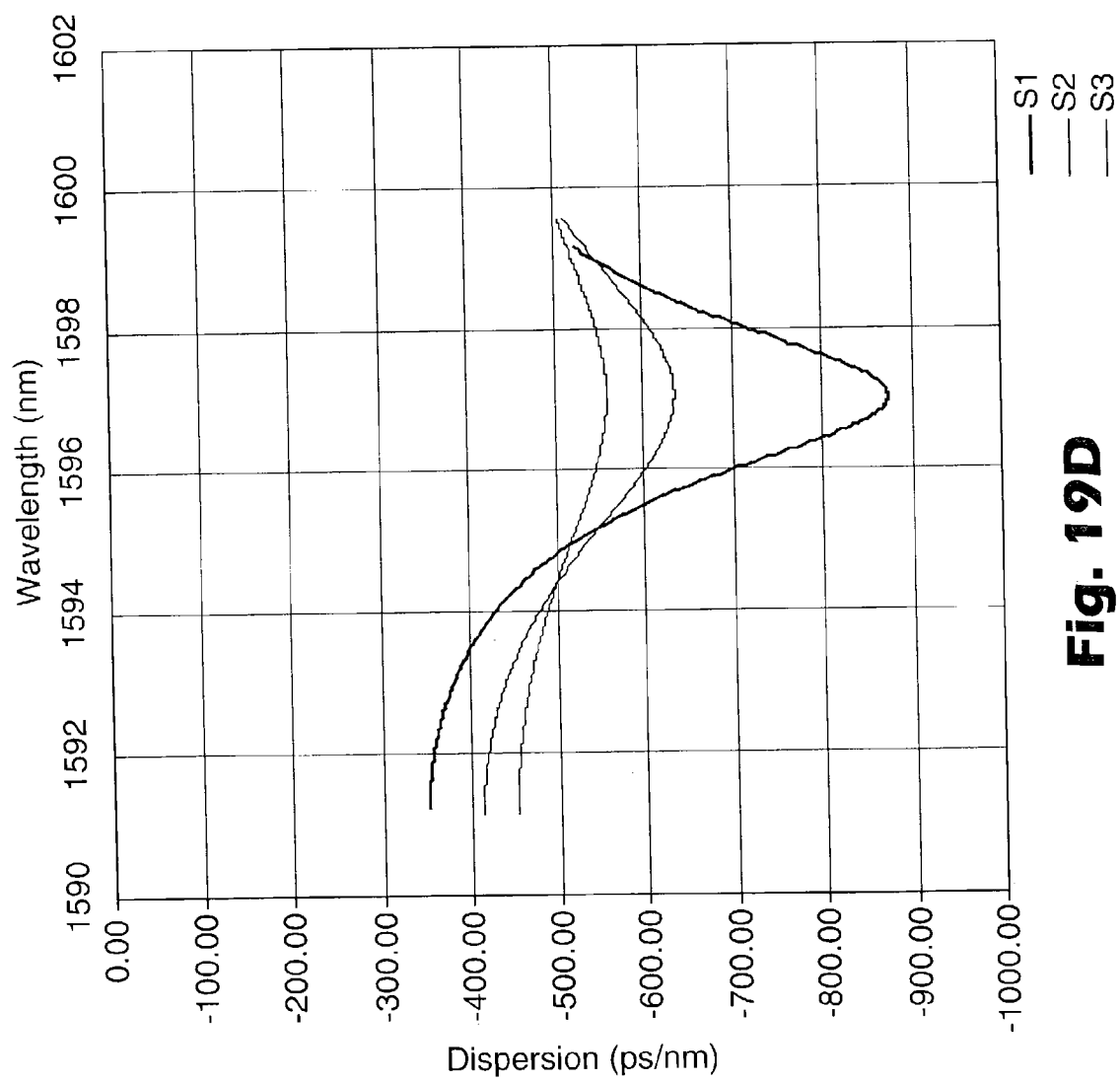

The effect of the bend radius R on delay and dispersion is illustrated in FIGS. 19C and 19D for a grating helically wrapped about a support member. The plots of FIGS. 19C and 19D model an optical waveguide grating having a dispersion of 500 ps/nm and an intrinsic chirp of about 20 nm of wavelength shift per meter of grating length (intrinsic chirp=20 nm/m) helically wrapped around a support rod having a radius of 7 mm. The grating is wrapped with a helix angle $\alpha$ of 2 degrees. The strain optic coefficient of the grating is approximately 0.24 (P=0.24). The support member is variously bent in an arc having a radius R of 5 meters (curve S1), 10 meters (curve S2), and 20 meters (curve S3).

In the exemplary embodiment of FIG. 18A, a single optical waveguide grating 556 is wound about the centroidal axis 552 of the support member 550. The slope of the dispersion curve of the grating 516 (as illustrated in FIG. 19B) can be seen to vary continuously between the extremes, such that there is no region where the slope of the dispersion curve is relatively constant. As a result, for a given rotation of the support member about its centroidal axis, at some points in the grating (i.e., where the slope of the dispersion curve is small) only a small change in dispersion will result, while at other points in the grating (i.e., where the slope of the dispersion curve is large) a large change in dispersion will result. In some applications, it is desirable that the slope of the dispersion curve be relatively constant, so that for a given rotation of the support member about its centroidal axis, the change in dispersion is approximately the same for all points along the grating.

Figure 18B:
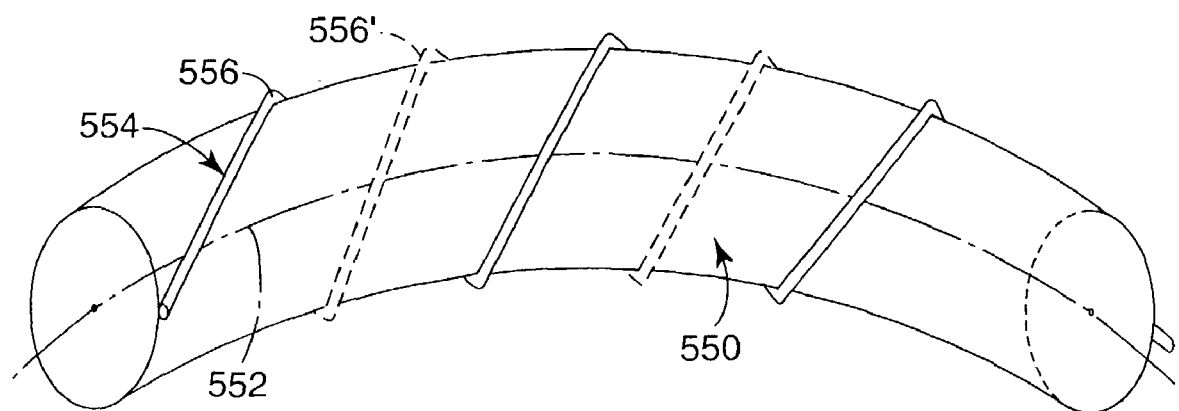
Figure 19E:
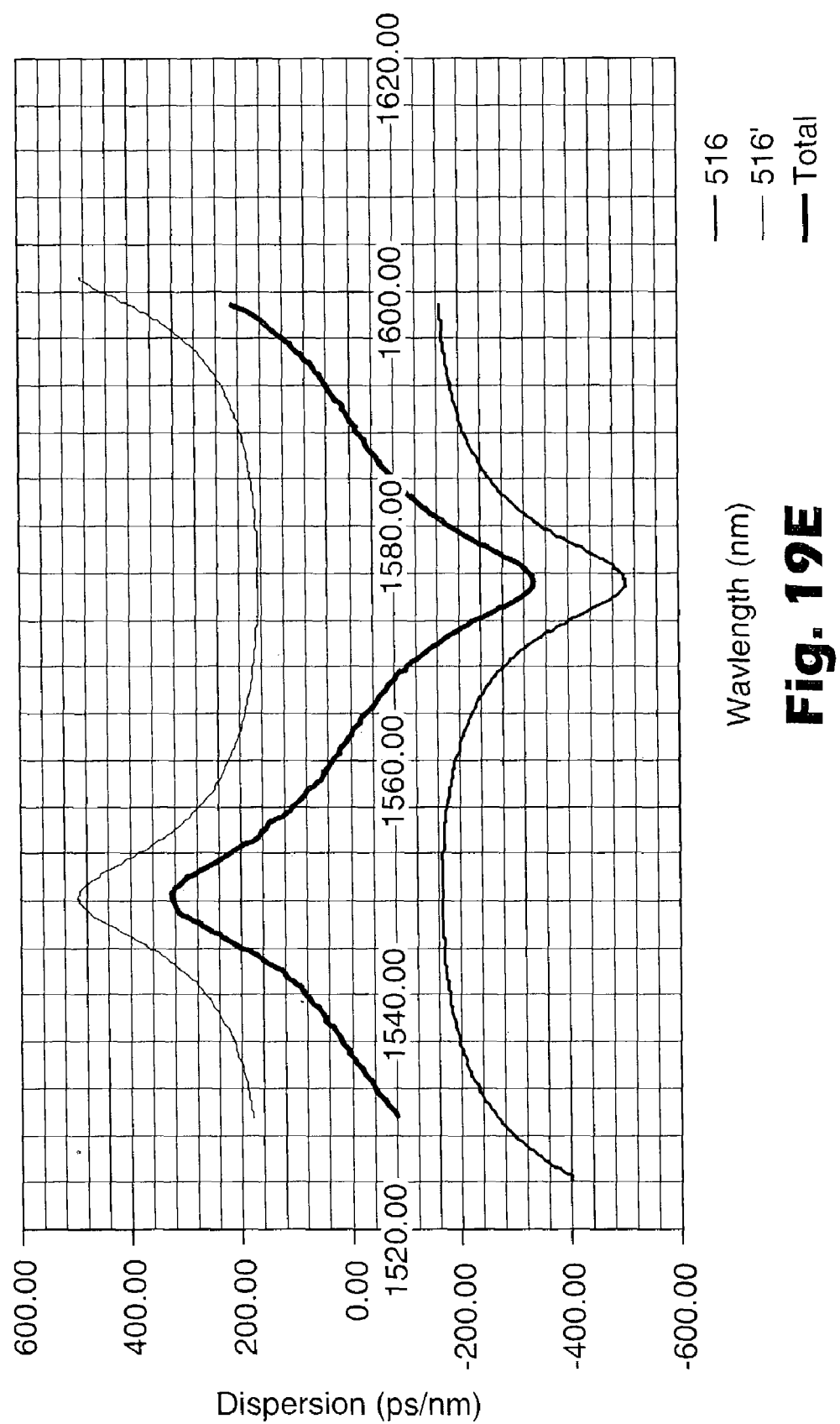

In an embodiment illustrated in FIG. 18B, two identical optical waveguide gratings 556, 556' are wound about the support member 550. Gratings 556, 556' are helically wrapped in a similar manner, with the gratings 556, 556' mounted on the support rod such that the two gratings are located on opposite sides of the support member (i.e. 180 degrees apart) at any point along their length. The optical signal for grating 556 is launched into the short wavelength end (right) and the optical signal is launched into grating 556' using the long wavelength end (left), such that their dispersion curves are of opposite signs and 180° apart. As illustrated in FIG. 19E, summing the dispersion curves of individual gratings 556, 556' provides a dispersion curve having a relatively constant slope. Advantageously for some applications, the dispersion curve resulting from the summed individual dispersion curves crosses the zero axis, such that the apparatus may be used to provide either positive or negative dispersion, as needed.

As discussed above and as shown in FIGS. 14–18B, the grating 556 may be attached to the support member 550 such that the longitudinal axis of the grating 556 has several different possible orientations with respect to the centroidal axis 552 of the support member. Tuning of the grating 556 is controlled in accordance with the equations provided above.

In another method for adjusting the spectral response of an optical grating 556 according to the invention, a generally unstrained grating 556 is attached to an already strained (i.e., bent or flexed) support member 550. The grating 556 is attached to the section of the support member having the greatest tension (e.g., the outside of the bend). As the support member 550 is rotated about its centroidal axis 552, the grating 556 moves from its original unstrained position on the outside of the support member 550 bend to a position where it sees a compressive strain as it moves toward the inside of the support member bend. The grating 556 is thus tuned using axial strain only, and no tensile strain is place on the grating 556.

The support member 550 has so far been described herein as having a circular cross-section. However, other cross-sectional profiles of support member 550 may also be implemented. For example, support member 550 may have an elliptical cross-section or any other non-circular cross-section. Additionally, the cross-section of support member 550 may vary along the length of support member 550.

Figure 20A:
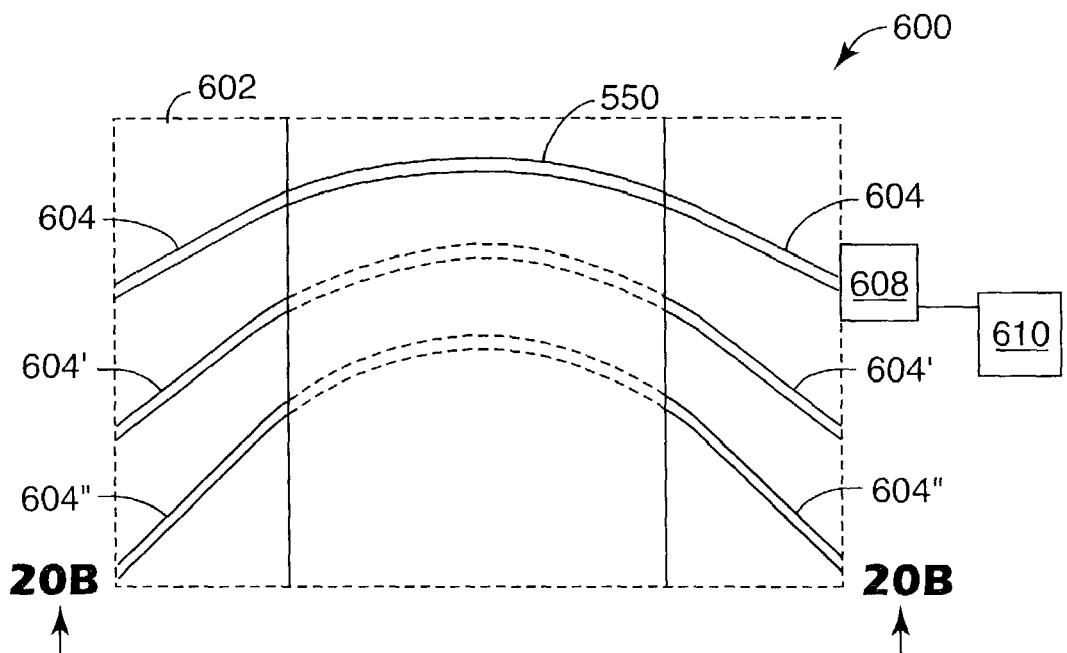
FIGS. 20A and 20B schematically illustrate an embodiment of a mechanism for bending and rotating the support member of the apparatuses of FIGS. 14–18B according to the invention.
Figure 20B:
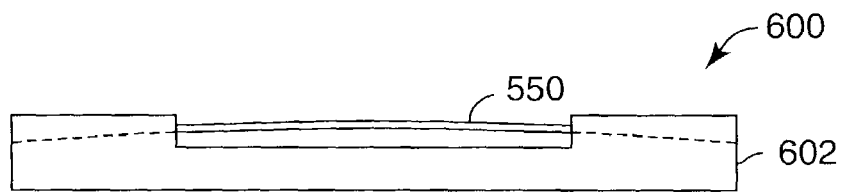

The mechanism for longitudinally bending and rotating the support member and attached grating 556 about the centroidal axis 552 may comprise any suitable device that provides controlled bending and rotating of the support member. One such mechanism 600 is illustrated in FIGS. 20A and 20B, in which a positioning plate 602 includes at least one set of positioning grooves 604. Grooves 604 are sized to receive support member 550, and are oriented to maintain a predetermined bend radius in support member 550. Multiple sets of grooves (for example, grooves 604', 604") corresponding to different bend radii may additionally be provided so that support member 550 can be bent across a range of predetermined bend radii. Support member 550 may be rotated about its centroidal axis 552 by, for example, rotating support member by hand, or by operably coupling support member 550 to a drive motor 608. Drive motor 608 may be manually controlled, or alternately controlled by controller 610 to automatically rotate support member 550 and thereby adjust the spectral response of grating 556.

Figure 21:
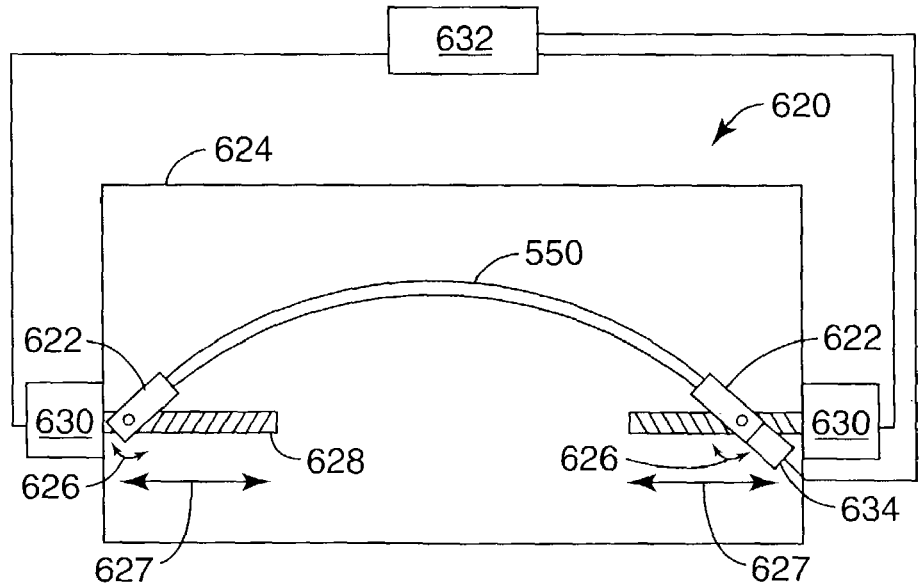
FIG. 21 schematically illustrates another embodiment of a mechanism for bending and rotating the support members of the apparatuses of FIGS. 14–18B according to the invention.

Another mechanism 620 for longitudinally bending and rotating the support member 550 and attached grating 556 about the centroidal axis 552 is illustrated in FIG. 21. Support member 550 is held adjacent its ends in ferrules 622. Ferrules 622 are pivotable with respect to base member 624 (as indicated by arrows 626), and are configured such that the distance between ferrules 622 may be altered (as indicated by arrows 627), thereby changing the bend radius of support member 550. For example, ferrules 622 may be moved between fixed, incremental positions in base member 624.

Alternately, the distance between ferrules 622 may be continuously adjusted, such as by attaching one or both of ferrules 622 to a drive mechanism 628, such as a screw drive, that moves ferrules 622 closer together or further apart as necessary to change the bend radius of support member 550. Drive mechanism 628 may be operated and controlled manually, or alternately controlled by a drive motor 630 and controller 632. Support member 550 may be rotated about its centroidal axis 552 by, for example, rotating, support member within ferrules 622 by hand, or by operably coupling support member 550 to a drive motor 634. Drive motor 634 may be manually controlled, or alternately controlled by controller 632 to automatically rotate support member 550 and thereby adjust the spectral response of grating 556.

The above-described embodiments according to the invention provide simple and cost effective ways to adjust (i.e., "tune") the wavelength and/or chromatic dispersion characteristics (i.e., the "spectral response") of an optical waveguide grating, such as a fiber Bragg grating or long period grating. The various embodiments require a small number of relatively simple parts, as compared to the devices and methods previously available. The various embodiments according to the invention provide apparatuses and methods for achieving a dispersion compensation apparatus having high reliability (i.e., reduced susceptibility to fiber failure due to static fatigue) by using a combination of beam bending and compressive preload on the optical grating to reduce strain in the grating. Reduced strain in the grating permits a wider bandwidth and tuning range.

Although specific embodiments have been illustrated and described herein for purposes of description of the preferred embodiment, it will be appreciated by those of ordinary skill in the art that a wide variety of alternate and/or equivalent implementations that achieve the same purposes may be substituted for the specific embodiments shown and described without departing from the scope of the present invention. Those with skill in the optical, mechanical, and opto-mechanical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for adjusting the spectral response of a optical waveguide grating, the method comprising:
    imparting a controlled bending force to a surface of a support member;
    attaching an optical waveguide grating to the surface of the support member, a longitudinal axis of the grating in alignment with the direction of the controlled bending force;
    removing the controlled bending force from the support member to create a compressive axial strain on the grating; and
    altering the axial strain in the grating to adjust its spectral response.

2. The method of claim 1, wherein attaching an optical waveguide grating to the surface of the support member comprises attaching a grating having a length of 100 mm or greater.

3. The method of claim 2, wherein attaching an optical waveguide grating to the surface of the support member comprises attaching a grating having a length of 1 m or greater.

4. The method of claim 1, wherein attaching an optical waveguide grating to the surface of the support member comprises attaching the grating along its entire length.

5. The method of claim 1, wherein the optical grating comprises an optical grating selected from the group consisting essentially of: fiber Bragg gratings and long period gratings.

6. The method of claim 1, wherein the support member is asymmetric about its neutral axis, and wherein imparting a controlled bending force to a surface of a support member comprises imparting a controlled bending force to the surface most distant from the neutral axis.

7. The method of claim 1, wherein altering the axial strain in the grating to adjust its spectral response comprises applying tensile axial strain to the grating.

8. The method of claim 7, wherein the compressive axial strain created in the grating has a magnitude equal to or greater than a magnitude of the tensile axial strain applied to the grating to adjust its spectral response.

9. An apparatus for adjusting the spectral response of an optical waveguide grating, the apparatus comprising:
    a support member to which a longitudinal optical waveguide grating can be attached, the optical waveguide grating being compressively axially strained by the support member; and
    a bending moment applicator to bend the support member for altering the axial strain of the optical waveguide grating to adjust its spectral response.

10. The apparatus of claim 9, wherein the support member comprises a longitudinal beam.

11. The apparatus of claim 9, wherein the bending moment applicator applies a pair of bending moments.

12. The apparatus of claim 9, wherein the support member is configured for bending and rotating about its centroidal axis.

13. The apparatus of claim 9, wherein where the support member is asymmetric about its neutral axis.

14. A method for pre-compressing an optical waveguide grating, the method comprising:
    applying a controlled bending force to a support surface of a support member;
    attaching an optical waveguide grating to the bent support surface of the support member, a longitudinal axis of the grating in alignment with the bending force;

removing the controlled bending force from the support surface to create a compressive axial strain on the grating.

15. A method for adjusting the spectral response of a optical waveguide grating, the method comprising:

imparting a controlled extension to a surface of a support member, wherein the support member is asymmetric about its neutral axis, and wherein imparting a controlled extension to a surface of a support member comprises imparting a controlled extension to the surface most distant from the neutral axis;

attaching an optical waveguide grating to the surface of the support member, a longitudinal axis of the grating in alignment with the direction of the controlled extension;

removing the controlled extension from the support member to create a compressive axial strain on the grating; and altering the axial strain in the grating to adjust its spectral response.

* * * * *

UNITED STATES PATENT AND TRADEMARK OFFICE
CERTIFICATE OF CORRECTION

PATENT NO.        : 7,006,731 B2
APPLICATION NO.   : 10/610962
DATED             : February 28, 2006
INVENTOR(S)       : Bylander, James R.

It is certified that error appears in the above-identified patent and that said Letters Patent is hereby corrected as shown below:

Drawing Sheet 15 of 16,
Above "Fig. 19E", delete "Wavlength" and insert in place thereof -- Wavelength --.

Column 2,
Line 65, delete "intrically" and insert in place thereof -- intrinsically --.

Column 3,
Line 16, after "equation" insert -- : --.

Column 5,
Line 21, delete "the to" and insert in place thereof -- to the --.
Line 32, delete "cross-sectional" and insert in place thereof -- cross-sectional --.

Column 10,
Line 3, after "member" insert -- . --.
Line 64, delete "ps/mn" and insert in place thereof -- ps/nm --.

Column 11,
Line 13, after "carbon" insert -- ) --.
Line 28, delete "cross sections" and insert in place thereof -- cross-sections --.

Column 12,
Line 27, after "grating" delete " , ".

Column 13,
Line 35, delete "(pot shown)" and insert in place thereof -- (not shown) --.

Column 15,
Line 32, delete "example;" and insert in place thereof -- example, --.
Line 40, delete "angle a" and insert in place thereof -- angle $\alpha$ --.

Column 16,
Line 13, delete "(i.e." and insert in place thereof -- (i.e., --.

Column 17,
Line 28, after "rotating" delete -- , --.

Column 18,
Line 2, delete "a" and insert in place thereof -- an --.
Line 59, after "wherein" delete "where".

UNITED STATES PATENT AND TRADEMARK OFFICE
CERTIFICATE OF CORRECTION

PATENT NO.        : 7,006,731 B2
APPLICATION NO. : 10/610962
DATED             : February 28, 2006
INVENTOR(S)      : Bylander, James R.

It is certified that error appears in the above-identified patent and that said Letters Patent is hereby corrected as shown below:

<u>Column 19,</u>
Line 4, delete "a" and insert in place thereof -- an --.

Signed and Sealed this

Fifteenth Day of August, 2006

JON W. DUDAS
*Director of the United States Patent and Trademark Office*